United States Patent
Haijima

(10) Patent No.: US 6,682,881 B2
(45) Date of Patent: Jan. 27, 2004

(54) ANTIFOAMING AGENT COMPOSITION FOR A SILVER HALIDE PHOTOGRAPHIC PROCESSING SOLUTION AND PROCESS FOR PROCESSING A SILVER HALIDE PHOTOGRAPHIC MATERIAL USING SAME

(75) Inventor: Akimitsu Haijima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/096,834

(22) Filed: Mar. 14, 2002

(65) Prior Publication Data
US 2003/0108826 A1 Jun. 12, 2003

(30) Foreign Application Priority Data
Mar. 14, 2001 (JP) .................... P. 2001-072523

(51) Int. Cl.[7] .................. G03C 5/305; G03C 7/20
(52) U.S. Cl. ....................................... 430/486
(58) Field of Search .......................... 430/486

(56) References Cited

U.S. PATENT DOCUMENTS

| 3,314,891 A | * | 4/1967 | Schmolka et al. | 510/228 |
| 4,983,316 A | * | 1/1991 | Starch | 510/340 |
| 6,069,210 A | * | 5/2000 | Cartridge et al. | 525/409 |

FOREIGN PATENT DOCUMENTS

| JP | 42-21868 | 10/1967 |
| JP | 45-6630 | 3/1970 |
| JP | 51-848 | 1/1976 |
| JP | 8-201994 | 8/1996 |
| JP | 2000-112095 | 4/2000 |

OTHER PUBLICATIONS

Abstract of CN–86106653 A Apr. 1988.*
Abstract of JP–2001222115 A Aug. 2001.*

* cited by examiner

Primary Examiner—Hoa Van Le
(74) Attorney, Agent, or Firm—Sughrue Mion, PLLC

(57) ABSTRACT

An antifoaming agent composition for a silver halide photographic processing solution, which comprises at least one of the specified (polyoxyethylene/polyoxypropylene) copolymer as a surface active agent.

11 Claims, No Drawings

ANTIFOAMING AGENT COMPOSITION FOR A SILVER HALIDE PHOTOGRAPHIC PROCESSING SOLUTION AND PROCESS FOR PROCESSING A SILVER HALIDE PHOTOGRAPHIC MATERIAL USING SAME

FIELD OF THE INVENTION

The present invention relates to an antifoaming agent composition for silver halide photographic (black-and-white and color) processing solution and more particularly to an antifoaming agent composition that can be preferably used for first black-and-white developer for silver halide reversal color photograph and/or its replenisher. Even more particularly, the present invention relates to an antifoaming agent composition for use in the minimization of developer streaks caused by foam produced in the developer and a process for the processing of a silver halide photographic material using the composition.

BACKGROUND OF THE INVENTION

A silver halide color reversal photographic material which has been exposed is then normally subjected to 1st black-and-white development, fogging, reversal color development and desilvering to form a reversal color image thereon. The silver halide photographic material comprises various surface active agents incorporated therein so that these surface active agents are eluted with the developer during development to make it easy for the developer to be bubbled. The developer is agitated by nitrogen or air ejected from the bottom of the bath to develop uniformly the photographic material However, this causes the accumulation of bubbles on the surface of the developer. Accordingly, when the photographic light-sensitive material enters into the development bath, these bubbles are attached to the photographic light-sensitive material, causing bubble-like developer streaks. This bubble-like developer streaks can easily occur particularly in the 1st black-and-white development of silver halide color reversal photographic material. Thus, this problem has awaited solution. Further, bubbles produced in the developer can be easily attached particularly to the photographic light-sensitive material in a process involving the successive development of individual photographic light-sensitive materials fixed in vertical position (hereinafter referred to as "hanging development").

Examples of the antifoaming agent to be incorporated in the developer include those produced by Fuji Photo Film Co., Ltd., and KODAK Defoamer Process E-6 (produced by Eastman Kodak Company). All these antifoaming agents contain a siloxane- or silicon-based compound, which can very hardly be dissolved in water, causing the production of suspended matters on the surface of the developer or stain inside the bath. Thus, an antifoaming agent having a higher water solubility than these compounds which still exerts the desired antifoaming effect has been desired. Further, the existing antifoaming agents are added to the developer as they are, but the antifoaming components are suspended on the surface of the bath or attached to the inner wall of the replenisher bath when added to the developer replenisher, making it impossible for the antifoaming components to be supplied into the developer in the development bath. Thus, no antifoaming effect can be exerted.

On the other hand, Japanese Patent Laid-Open No. 1993-88326 discloses a method which comprises processing a photographic light-sensitive material with a color developer containing at least one specific fluorine-based compound but substantially free of sulfite ion so that the variation of photographic properties during continuous processing and the production and growth of deposits in the processing bath can be inhibited. As described in the above cited patent, the developer substantially free of sulfite ion (The term "substantially free of sulfite ion" indicates that sulfite ion is incorporated in an amount of not greater than 3 mmol/l as described in line 3-line 4, left column, page 9 of the above cited patent) gives less variation of photographic properties and causes remarkably lessened production of deposits in the processing bath if it comprises the fluorine-based compound described in the above cited patent incorporated therein. However, a developer containing sulfite ion (normally in an amount of from 100 to 200 mmol/l) such as 1st black-and-white developer for silver halide reversal color photograph can provide no such an effect even if it comprises the fluorine-based compound described in the above cited patent incorporated therein.

Further, Japanese Patent Laid-Open No. 1996-201994 discloses a developer containing at least one amino acid derivative-based surface active agent and a developer containing at least one amino acid derivative-based surface active agent and at least one fluorine-based surface active agent. This approach allows the reduction of occurrence of developer streaks caused when the surface of a silver halide photographic material is stained by fingerprint or the like. However, the foregoing amino acid derivative-based surface active agent cannot be incorporated in the 1st black-and-white developer for reversal color photograph because it causes the variation of photographic properties. Further, as described in the above cited patent (line 20-line, right column, page 2), this approach is disadvantageous in that the addition of a fluorine-based surface active agent to the developer causes turbidity/precipitation that causes the attachment of stain to the surface of the photographic light-sensitive material, accelerating uneven processing.

Under these circumstances, an antifoaming agent having an excellent antifoaming effect and stability which can be used in the processing of reversal color photograph as well has been desired.

The inventors earlier found that a fluorine-based surface active agent containing a perfluoroalkyl group having a specific structure exerts a great antifoaming effect and causes neither turbidity/precipitation nor processing stain even when incorporated in the 1st black-and-white developer for reversal color photograph. The inventors then proposed this fluorine-based surface active agent as an antifoaming agent composition for silver halide photographic processing, particularly for reversal color photographic processing, which can meet the foregoing demand of the market in Japanese Patent Laid-Open No. 2000-112095. This fluorine-based surface active agent containing such a perfluoroalkyl group exerts a desirable effect on the solution to the foregoing problems such as antifoaming capacity for color photographic processing and inhibition of turbidity or precipitation.

On the other hand, the color reversal photographic light-sensitive material tends to be slowly developed at highly-exposed area at the 1st development step. Thus, the resulting highlighted area tends to become less hard. Accordingly, when development is accelerated, less exposed area is overdeveloped, making it difficult to balance the progress of development. The solution to this problem has been a long time assignment in the technique for emulsion of photographic light-sensitive material and the technique of 1st development. Some surface active agents have a good or adverse effect on the progress of development. The foregoing fluorine-based surface active agent containing a perfluoroalkyl group has no effect or an effect of inhibiting the process of development. If a surface active agent which can be used as an antifoaming agent has a desirable effect on the progress of development to improve the gradation of highlighted area, its value is extremely great.

SUMMARY OF THE INVENTION

Therefore, an object of the present invention is to provide a technique which can exert the foregoing effect of improving gradation while maintaining the effect of eliminating foam in the developer and the stability high enough to prevent deposition embodied in the above cited Japanese Patent Laid-Open No. 2000-112095. In some detail, an object of the present invention is to provide a composition and antifoaming process which can raise the gradation of highlighted area, eliminate the occurrence of turbidity or precipitation in the developer and lessen developer streaks caused by bubbles produced in the developer, particularly 1st reversal color photographic black-and-white developer.

Another object of the present invention is to provide a developer replenisher containing the foregoing composition.

A further object of the present invention is to provide a process for processing a silver halide photographic material, which comprises processing in the presence of the foregoing composition.

In the light of the fact that the foregoing fluorine-based surface active agent exerts an outstanding effect of surface tension but is not necessarily satisfactory in other respects, the inventors made a wide search for surface tension-lowering compounds and studied their anti-foaming effect, not only fluorine-based compounds. During the procedure of study, the inventors unexpectedly found that among polyalkylene glycols which do not necessarily exert an outstanding effect of lowering surface tension are those having a great anti-foaming effect. The inventors then made an extensive study of compounds having a poly(alkyleneoxy) group. As a result, the foregoing objects of the invention were accomplished by the use of the following compounds.

The present invention lies in the following constitutions.

(1) An antifoaming agent composition for a silver halide photographic processing solution, which comprises at least one of (polyethylene oxide/polypropylene oxide) copolymer represented by formulae (I) to (IV) below as a surface active agent:

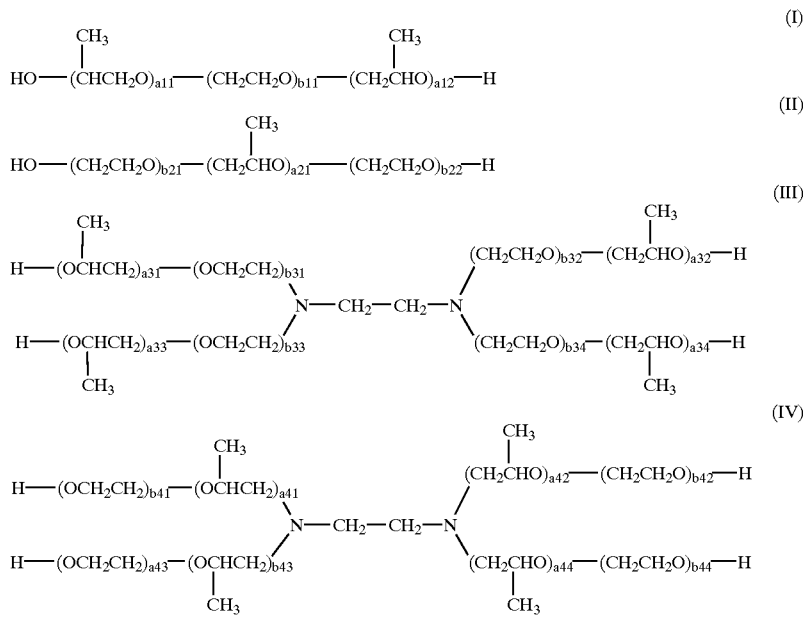

wherein $a_{11}$, $a_{12}$, $b_{11}$, $a_{21}$, $b_{21}$, $b_{22}$, $a_{31}$, $a_{32}$, $a_{33}$, $a_{34}$, $b_{31}$, $b_{32}$, $b_{33}$, $b_{34}$, $a_{41}$, $a_{42}$, $a_{43}$, $a_{44}$, $b_{41}$, $b_{42}$, $b_{43}$ and $b_{44}$ each independently represents the average number of the respective alkyleneoxy groups.

(2) The antifoaming agent composition according to the item (1), wherein the (polyethylene oxide/polypropylene oxide) copolymer is a (polyethylene oxide/polypropylene oxide) copolymer represented by formula (I) containing: an ethylene oxide group in a proportion of from 30% to 70% by weight; and a propylene oxide group moiety having a molecular weight of 1,000 to 6,000.

(3) The antifoaming agent composition according to the item (2), wherein the (polyethylene oxide/polypropylene oxide) copolymer represented by formula (I) contains: the ethylene oxide group in a proportion of from 40% to 65% by weight; and the propylene oxide group moiety having a molecular weight of 2,000 to 5,500.

(4) The antifoaming agent composition according to the item (2), wherein the (polyethylene oxide/polypropylene oxide) copolymer represented by formula (I) contains: the ethylene oxide group in a proportion of from 50% to 60% by weight; and the propylene oxide group moiety having a molecular weight of 2,500 to 4,500.

(5) The antifoaming agent composition according to the item (1), which is received in a package.

(6) The antifoaming agent composition according to the item (1), wherein the silver halide photographic processing solution is a first black-and-white developer for a silver halide color reversal photographic material.

(7) A process for defoaming a first black-and-white development bath, which comprises eliminating a foam produced on the surface of a first black-and-white developer for a silver halide color reversal photographic material with the antifoaming agent composition according to the item (1).

(8) A first black-and-white developer replenisher for a silver halide color reversal photographic material, which comprises the (polyethylene oxide/polypropylene oxide) copolymer according to the item (1) as a surface active agent.

(9) A method for processing a silver halide photographic material, which comprises processing a silver halide color photographic material with a processing solution comprising the (polyethylene oxide/polypropylene oxide) copolymer according to the item (1) as a surface active agent.

The present invention will be further described hereinafter.

DETAILED DESCRIPTION OF THE INVENTION

Firstly, the (polyethylene oxide/polypropylene oxide)-based copolymer type surface active agents represented by the general formulae (I) to (IV) of the invention will be further described.

The proportion of the ethyleneoxy group in the molecule of each compound represented by the general formula (I), (II), (III) or (IV) is from 5 to 80% by weight, preferably from 30 to 70% by weight, more preferably from 40 to 65% by weight, particularly from 50 to 60% by weight. The molecular weight of the propyleneoxy group moiety of each compound represented by the general formula (I), (II), (III) or (IV) is from 500 to 7,000, preferably from 1,000 to 6,000.

More specifically, referring to the compound of the general formula (I), the proportion of the ethyleneoxy group is from 5 to 80% by weight, preferably from 30 to 70% by weight, more preferably from 40 to 65% by weight, particularly from 50 to 60% by weight, and the molecular weight of the propyleneoxy group moiety thereof is from 500 to 7,000, preferably from 1,000 to 6,000, more preferably from 2,000 to 5,500, particularly from 2,500 to 4,500.

The compound of the general formula (I) is preferably a (polyethylene oxide/polypropylene oxide) copolymer in which the proportion of the ethyleneoxy group is 30 to 70% by weight and the molecular weight of the propyleneoxy group moiety thereof is from 1,000 to 6,000. The compound of the general formula (I) is more preferably a (polyethylene oxide/polypropylene oxide) copolymer in which the proportion of the ethyleneoxy group is 40 to 65% by weight and the molecular weight of the propyleneoxy group moiety thereof is from 2,000 to 5,500. The compound of the general formula (I) is still more preferably a (polyethylene oxide/polypropylene oxide) copolymer in which the proportion of the ethyleneoxy group is 50 to 60% by weight and the molecular weight of the propyleneoxy group moiety thereof is from 2,500 to 4,500.

Referring to the compound of the general formula (II), the proportion of ethyleneoxy group is from 10 to 70% by weight, preferably from 20 to 60% by weight, more preferably from 30 to 50% by weight, and the molecular weight of the propyleneoxy group moiety thereof is from 1,000 to 4,000, preferably from 1,500 to 3,000. The compound of the general formula (II) is preferably a (polyethylene oxide/polypropylene oxide) copolymer in which the proportion of the ethyleneoxy group is 20 to 60% by weight and the molecular weight of the propyleneoxy group moiety thereof is from 1,000 to 4,000. The compound of the general formula (II) is more preferably a (polyethylene oxide/polypropylene oxide) copolymer in which the proportion of the ethyleneoxy group is 30 to 50% by weight and the molecular weight of the propyleneoxy group moiety thereof is from 1,500 to 3,000.

Referring to the compound of the general formula (III), the proportion of ethyleneoxy group is from 10 to 70% by weight, preferably from 20 to 60% by weight, more preferably from 30 to 50% by weight, and the molecular weight of the propyleneoxy group moiety thereof is from 500 to 7,000, preferably from 2,000 to 6,000.

The compound of the general formula (III) is preferably a (polyethylene oxide/polypropylene oxide) copolymer in which the proportion of the ethyleneoxy group is 20 to 60% by weight and the molecular weight of the propyleneoxy group moiety thereof is from 500 to 7,000. The compound of the general formula (III) is more preferably a (polyethylene oxide/polypropylene oxide) copolymer in which the proportion of the ethyleneoxy group is 30 to 50% by weight and the molecular weight of the propyleneoxy group moiety thereof is from 2,000 to 6,000.

Referring to the compound of the general formula (IV), the proportion of ethyleneoxy group is from 10 to 70% by weight, preferably from 20 to 60% by weight, more preferably from 30 to 50% by weight, and the molecular weight of the propyleneoxy group moiety thereof is from 1,000 to 7,000, preferably from 2,000 to 6,000.

The compound of the general formula (IV) is preferably a (polyethylene oxide/polypropylene oxide) copolymer in which the proportion of the ethyleneoxy group is 20 to 60% by weight and the molecular weight of the propyleneoxy group moiety thereof is from 1,000 to 7,000. The compound of the general formula (IV) is more preferably a (polyethylene oxide/polypropylene oxide) copolymer in which the proportion of the ethyleneoxy group is 30 to 50% by weight and the molecular weight of the propyleneoxy group moiety thereof is from 2,000 to 6,000.

The above proportion of the ethyleneoxide group is a value obtained by rounding number of decimals.

Therefore, $a_{11}$ and $a_{12}$ in the general formula (I) each are from 5 to 60, preferably from 8 to 50, more preferably from 10 to 40. The suffixes $a_{11}$ and $a_{12}$ may be the same or different, preferably the same. The suffix $b_{11}$ is from 3 to 350, preferably from 5 to 200, more preferably from 10 to 150.

The suffix $a_{21}$ in the general formula (II) is from 10 to 100, preferably from 15 to 80, more preferably from 20 to 60. The suffixes $b_{21}$ and $b_{22}$ each are from 2 to 200, preferably from 3 to 150, more preferably from 5 to 100. The suffixes $b_{21}$ and $b_{22}$ may be the same or different, preferably the same.

The suffixes $a_{31}$, $a_{32}$, $a_{33}$ and $a_{34}$ in the general formula (III) each are from 2 to 100, preferably from 5 to 80, more preferably from 7 to 50. The suffixes $b_{31}$, $b_{32}$, $b_{33}$ and $b_{34}$ each are from 2 to 200, preferably from 3 to 100, more preferably from 5 to 50.

The suffixes $a_{41}$, $a_{42}$, $a_{43}$ and $a_{44}$ in the general formula (IV) each are from 2 to 100, preferably from 5 to 80, more preferably from 7 to 50. The suffixes $b_{41}$, $b_{42}$, $b_{43}$ and $b_{44}$ each are from 2 to 200, preferably from 3 to 100, more preferably from 5 to 50.

The foregoing cardinal numbers $a_{11}$ to $a_{44}$ and $b_{11}$ to $b_{44}$ each normally indicate the average value of a compound having some distribution of units. The distribution of units is preferably as narrow as within ±20%, more preferably within ±10%, particularly within ±5%.

When the proportion of ethyleneoxy group exceeds the above defined range, the antifoaming effect of the invention is remarkably impaired. On the contrary, when the proportion of ethyleneoxy group is too low, the solubility of the compound deteriorates and causes the processing solution to undergo turbidity below cloud point. Further, when the molecular weight of the propyleneoxy group moiety of the molecule exceeds the above defined range, the solubility of the compound decreases, causing the processing solution to undergo turbidity. On the contrary, when the molecular weight of the propyleneoxy group moiety of the molecule falls below the above defined range, the antifoaming effect of the invention is impaired. Within the foregoing range of the proportion of ethyleneoxy group and the molecular weight of propyleneoxy group moiety where the foregoing compounds of the general formulae (I) to (IV) exert an antifoaming effect, the progress of development can be enhanced, improving the linearity of gradation of photographic light-sensitive material to be processed. Therefore, by selecting a (polyethylene oxide/polypropylene oxide)-based copolymer type surface active agent containing an ethyleneoxy group in the above defined proportion and a molecular weight in its propyleneoxy group moiety within the above defined range, the solubility of the compound in the developer and the progress of development can be improved, making it possible to improve the gradation of highlighted area as well as eliminate developer streaks.

Moreover, two or more of (polyethylene oxide/polypropylene oxide)-based copolymer type surface active agents of the invention may be used in admixture. This is desirable from the standpoint of enhancement of solubility.

Specific examples of the (polyethylene oxide/polypropylene oxide)-based copolymer type surface active agents represented by the general formulae (I) to (IV) of the invention will be given below with the average number of constituent ethyleneoxy groups and propyleneoxy groups. However, the present invention is not limited to these compounds.

TABLE

Examples of the compound of the invention

| Compound No. | Number of PO group units $A_{11}$ | $a_{12}$ | Number of PO group units $b_{11}$ | Proportion of EO group (wt %) | Molecular weight of PO group moiety |
|---|---|---|---|---|---|
| I-1 | 60 | 60 | 10 | 6 | 6,960 |
| I-2 | 25 | 25 | 7.5 | 10 | 2,900 |
| I-3 | 32 | 32 | 15 | 15 | 3,712 |
| I-4 | 21.3 | 21.3 | 14.1 | 20 | 2,471 |
| I-5 | 25 | 25 | 22 | 25 | 2,900 |
| I-6 | 23 | 23 | 26 | 30 | 2,668 |
| I-7 | 30 | 30 | 52 | 40 | 3,480 |
| I-8 | 30 | 15 | 40 | 40 | 2,610 |
| I-9 | 18.6 | 18.6 | 32.7 | 40 | 2,458 |
| I-10 | 13 | 13 | 23 | 40 | 1,508 |
| I-11 | 9 | 9 | 16 | 40 | 1,044 |
| I-12 | 15 | 15 | 40 | 50 | 1,740 |
| I-13 | 15 | 15 | 60 | 60 | 1,740 |
| I-14 | 5 | 5 | 30 | 69 | 580 |
| I-15 | 50 | 50 | 300 | 69 | 5,800 |
| I-16 | 15 | 15 | 155 | 80 | 1,740 |
| I-17 | 30 | 30 | 80 | 50 | 3,485 |
| I-18 | 26 | 26 | 85 | 55 | 3,020 |
| I-19 | 25 | 25 | 100 | 60 | 2,904 |
| I-20 | 30 | 30 | 100 | 56 | 3,485 |
| I-21 | 34 | 34 | 135 | 60 | 3,944 |
| I-22 | 30 | 30 | 150 | 65 | 3,480 |
| I-23 | 45 | 45 | 180 | 60 | 5,220 |
| I-24 | 40 | 40 | 200 | 65 | 4,640 |
| I-25 | 38 | 38 | 120 | 55 | 4,408 |

| | $a_{21}$ | $b_{21}$ | $b_{22}$ | | |
|---|---|---|---|---|---|
| II-1 | 30 | 5 | 5 | 20 | 1,740 |
| II-2 | 28 | 8 | 8 | 30 | 1,624 |
| II-3 | 32 | 15 | 15 | 42 | 1,856 |
| II-4 | 36 | 24 | 24 | 50 | 2,088 |
| II-5 | 52 | 25 | 25 | 42 | 3,016 |
| II-6 | 68 | 25 | 15 | 31 | 3,944 |

| | $a_{31}$ | $a_{32}$ | $a_{33}$ | $a_{34}$ | $b_{31}$ | $b_{32}$ | $b_{33}$ | $b_{34}$ | | |
|---|---|---|---|---|---|---|---|---|---|---|
| III-1 | 24 | 24 | 24 | 24 | 8 | 8 | 8 | 8 | 20 | 5,568 |
| III-2 | 25 | 25 | 25 | 25 | 15 | 15 | 15 | 15 | 31 | 5,800 |
| III-3 | 20 | 20 | 20 | 20 | 20 | 20 | 20 | 20 | 43 | 4,640 |
| III-4 | 15 | 15 | 15 | 15 | 20 | 20 | 20 | 20 | 50 | 3,480 |
| III-5 | 15 | 15 | 15 | 15 | 10 | 10 | 10 | 10 | 33 | 3,480 |
| III-6 | 15 | 5 | 15 | 5 | 9 | 3 | 9 | 3 | 31 | 2,320 |

| | $a_{41}$ | $a_{42}$ | $a_{43}$ | $a_{44}$ | $b_{41}$ | $b_{42}$ | $b_{43}$ | $b_{44}$ | | |

TABLE-continued

| | | | | Examples of the compound of the invention | | | | | |
|---|---|---|---|---|---|---|---|---|---|
| IV-1 | 24 | 24 | 24 | 24 | 8 | 8 | 8 | 8 | 20 | 5,568 |
| IV-2 | 25 | 25 | 25 | 24 | 15 | 15 | 15 | 15 | 31 | 5,800 |
| IV-3 | 20 | 20 | 20 | 20 | 20 | 20 | 20 | 20 | 43 | 4,640 |
| IV-4 | 15 | 15 | 15 | 15 | 20 | 20 | 20 | 20 | 50 | 3,480 |
| IV-5 | 8.8 | 8.8 | 8.8 | 8.8 | 3.8 | 3.8 | 3.8 | 3.8 | 24 | 2,042 |
| IV-6 | 12.5 | 12.5 | 12.5 | 12.5 | 2.8 | 2.8 | 2.8 | 2.8 | 14 | 2,900 |

(Note) PO group: propylene oxide group; EO group: ethylene oxide group

As the (polyethylene oxide/polypropylene oxide)-based copolymer type surface active agent to be used in the invention there is preferably used any of I-6 to I-13, I-15, I-17 to I-25 and II-2 to II-6, more preferably I-7 to I-9, I-17 to I-25, particularly I-17 to I-21 and I-25.

Preferred among the foregoing compounds of the general formulae (I) to (IV) of the invention are those of the general formulae (I) and (II), particularly of the general formula (I).

Examples of the compounds of the general formulae (I) to (IV) of the invention include Pluronic R, Pluronic, Tetronic R and Tetronic, which are nonionic surface active agents commercially available from BASF Co.

The antifoaming agent composition for silver halide photographic processing comprising the (polyethylene oxide/polypropylene oxide)-based copolymer type surface active agent of the invention may be added to the development bath as it is, may be added to the preparation bath as a replenisher component during the preparation of replenisher or may be previously added to concentrated mixed processing agent arranged in a kit. The form of the antifoaming agent composition of the invention is not limited to mixture with other components. The antifoaming agent composition of the invention may be used in the form of crystal, powder or paste, singly or in admixture with other components. In particular, the antifoaming agent composition of the invention is preferably used in the form of concentrated liquid composition.

The antifoaming agent composition of the invention is preferably used in the form of concentrated aqueous solution. In this case, the concentration of (polyethylene oxide/polypropylene oxide)-based copolymer type surface active agent is preferably from 0.01 to 100 g/l, more preferably from 0.05 to 50 g/l, particularly from 0.1 to 20 g/l. In order to enhance the solubility of the (polyethylene oxide/polypropylene oxide)-based copolymer type surface active agent in the concentrated aqueous solution, the aqueous solution may comprise an alcohol such as methanol, ethanol and propanol and/or a glycol such as ethylene glycol, diethylene glycol and dipropylene glycol incorporated therein in an amount of from 0 to 50% by weight besides water. Among these alcohols, ethanol is preferably used in an amount of from 5 to 50% by weight.

As the antifoaming agent composition of the invention, a (polyethylene oxide/polypropylene oxide)-based copolymer type compound represented by one of the general formulae (I) to (IV) is preferably provided in the form of aqueous solution. Distilled water or ion-exchanged water is preferably used from the antibacterial standpoint of view.

Further, the content of calcium and magnesium ions in the antifoaming agent composition of the invention may be reduced by the method described in Japanese Patent Laid-Open No. 1987-288838. Moreover, the antifoaming agent composition of the invention may comprise an isothiazolone compound or thiabendazole described in Japanese Patent Laid-Open No. 1982-8542, a chlorine-based germicide such as chlorinated sodium isocyanurate, benzotriazole and a germicide described in Japanese Patent Laid-Open No. 1996-262268 (line 5-line 15, right column, page 8) incorporated therein.

As a package for the antifoaming agent composition of the invention, there is preferably used the following container. The container may be made of a single material or a composite material such as composite material comprising a material having a high gas permeability and a material having a high inertness to alkali. The container is preferably formed by a single material from the standpoint of reusability and recyclability. Examples of the material to be used for the container include polyester resin, polyolefin resin, acrylic resin, ABS resin, epoxy resin, polyamide resin such as nylon, polyurethane resin, polystyrene resin, polycarbonate resin, PVA, polyvinyl chloride, polyvinylidene chloride, and polyethylene resin. Preferred among these vessels are those formed singly by a polyester resin such as polyethylene terephthalate and polyethylene naphthalate or polyolefin resin such as polyethylene and polypropylene. Particularly preferred among these materials is polyethylene resin.

The processing solution (including replenisher) for silver halide photographic material, particularly the 1st reversal color photographic black-and-white developer or its replenisher, comprises the (polyethylene oxide/polypropylene oxide)-based copolymer type compound represented by one of the general formulae (I) to (IV) preferably in an amount of from 0.001 to 50 ml, more preferably from 0.01 to 20 ml, particularly from 0.05 to 10 ml per liter of the developer or developer replenisher. Therefore, the concentration of the (polyethylene oxide/polypropylene oxide)-based copolymer type compound in the composition is arranged such that the following concentration in the processing solution can be reached within the above cited range of added amount.

The concentration of the (polyethylene oxide/polypropylene oxide)-based copolymer type compound represented by one of the general formulae (I) to (IV) in the processing solution (including replenisher) for silver halide photographic material, particularly 1st reversal color photographic black-and-white developer replenisher is preferably from 0.0001 to 0.1 g/l, more preferably from 0.0002 to 0.05 g/l, particularly from 0.0005 to 0.02 g/l. The added amount of the antifoaming agent composition of the invention is arranged such that the concentration of the (polyethylene oxide/polypropylene oxide)-based copolymer type compound of the invention falls within the above cited range.

The silver halide color photographic processing solution is normally prepared by diluting the concentrated processing agent (processing agent composition) with water (three times to 20 times). In this embodiment of use, a concentrated replenisher (processing solution composition) containing a (polyethylene oxide/polypropylene oxide)-based copolymer type compound represented by one of the general formulae (I) to (IV) may be used to prepare a replenisher which is then added to the processing solution in the processing bath during development. In this process, too, the present invention provides similar effect of the invention.

The antifoaming agent composition of the invention may be widely used in the processing of color photographic light-sensitive material regardless of which it is used for picture-taking or printing. However, since the present invention exerts its effect particularly on the processing of color reversal photographic light-sensitive material as previously mentioned, the following description of embodiments will be made mainly with reference to the case where the present invention is applied to the processing of color reversal photographic light-sensitive material. However, this doesn't mean that the antifoaming agent composition of the invention is limited to the processing of color reversal photographic light-sensitive material. The antifoaming agent composition of the invention can be also used in the processing of other color photographic light-sensitive materials according to the following embodiments.

The color reversal processing step of the invention will be generally described hereinafter. Firstly, the black-and-white development bath (1st development bath) which is the first step will be described. The black-and-white developer in the black-and-white development bath there may comprise a developing agent which has heretofore been known. As the developing agent there may be used dihydroxybenzene (e.g., hydroquinone, hydroquinone monosulfonate), 3-pyrazolidone (e.g., 1-phenyl-3-pyrazolidone, 1-phenyl-4-methyl-4-hydroxymethyl-3-pyrazolidone), aminophenol (e.g., N-methyl-p-aminophenol, N-methyl-3-methyl-p-aminophenol), ascorbic acid and isomer or derivative thereof, singly or in combination. A preferred developing agent is potassium hydroquinonemonosulfonate or sodium hydroquinonemonosulfonate. The amount of such a developing agent to be added is about from $1 \times 10^{-5}$ mol to 2 mol per liter of the developer.

The black-and-white developer may comprise a preservative incorporated therein as necessary. As such a preservative there may be normally used a sulfite or bisulfite. The amount of such a preservative to be added is from 0.01 mols to 1 mol/l, preferably from 0.1 mols to 0.5 mols/l. Ascorbic acid, too, is a useful preservative. A preferred amount of ascorbic acid to be added is from 0.01 mols to 0.5 mols/l. Besides these preservatives, hydroxylamines, saccharides, o-hydroxyketones and hydrazines as described in Japanese Patent Laid-Open No. 1928-144446, etc. may be used. The amount of such a preservative to be added is not greater than 0.1 mols/l.

The pH value of the black-and-white developer is preferably from 8 to 12, particularly from 9 to 11. The black-and-white developer may comprise various buffers incorporated therein to maintain desired pH value. Preferred examples of the buffer employable herein include carbonate, phosphate, borate, 5-sulfosalicylate, hydroxybenzoate, glycine salt, N,N-dimethylglycine salt, leucine salt, norleucine salt, guanine salt, 3,4-dihydroxyphenylalanine salt, alanine salt, aminobutyrate, valine salt, lysine salt, etc. In particular, the use of carbonate, borate or 5-sulfosalicylate is desirable because the foregoing pH range can be kept and these preservatives are inexpensive. These buffers may be used singly or in combination of two or more thereof. In order to obtain desired pH value, the black-and-white developer may comprise an acid and/or alkali incorporated therein.

As such an acid there may be used an inorganic or organic water-soluble acid. Examples of such an acid include sulfuric acid, nitric acid, hydrochloric acid, acetic acid, propionic acid, ascorbic acid, etc. As the alkali there may be used any hydroxide or ammonium salt. Examples of such an alkali include potassium hydroxide, sodium hydroxide, aqueous ammonia, triethanolamine, diethanolamine, etc.

Further, the black-and-white developer preferably comprises as a development accelerator a silver halide solvent incorporated therein. Preferred examples of such a silver halide solvent include thiocyanate, sulfite, thiosulfate, 2-methylimidazole, thioether-based compound described in Japanese Patent Laid-Open No. 1982-63580, etc. The amount of such a compound to be added is preferably from about 0.005 to 0.5 mols/l. Other examples of the development accelerator employable herein include various quaternary amines, polyethylene oxides, 1-phenyl-3-pyrazolidones, primary amines, N,N,N',N'-tetramethyl-p-phenylenediamine, etc.

Moreover, the black-and-white developer may comprise as a dissolution aid diethylene glycol, propylene glycol, polyethylene glycols or amines such as diethanolamine and triethanolamine incorporated therein. The black-and-white developer may comprise as a sensitizing agent a quaternary ammonium salt incorporated therein. The black-and-white developer may comprise various surface active agents or hardeners incorporated therein.

The black-and-white development bath may comprise various fog inhibitors incorporated therein for the purpose of inhibiting development fog. Preferred examples of the fog inhibitor include halide of alkaline metal such as sodium chloride, potassium chloride, potassium bromide, sodium bromide and potassium iodide, and organic fog inhibitor. Examples of the organic fog inhibitor employable herein include nitrogen-containing heterocyclic compound such as benzotriazole, 6-nitrobenzimidazole, 5-nitrosoindazole, 5-methylbenzotriazole, 5-nitrobenzotriazole, 5-chlorobenzotriazole, 2-thiazolyl-benzimidazole, 2-thiazolyl-benzimidazole and hydroxyazaindolizine, mercapto-substituted heterocyclic compound such as 1-phenyl-5-mercaptotetrazole, 2-mercaptobenzoimidazole and 2-mercaptobenzothiazole, and mercapto-substituted aromatic compound such as thiosalicylic acid. These fog inhibitors may include those which are eluted from the color reversal film during processing and accumulated in the developer.

Among these fog inhibitors, iodide is added in an amount of from about $5 \times 10^{-6}$ mol/l to $5 \times 10^{-4}$ mol/l. A bromide is preferably used to inhibit fog. The bromide is added preferably in a concentration of from about 0.001 mol/l to 0.1 mol/l, particularly from about 0.01 mol/l to 0.05 mol/l.

Further, the black-and-white developer may comprise a swelling inhibitor (e.g., inorganic salt such as sodium sulfate and potassium sulfate) or water softener incorporated therein. As such a water softener there may be used a compound having any structure such as aminopolycarboxylic acid, aminopolyphosphonic acid, phosphonocarboxylic acid, organic phosphonic acid and inorganic phosphonic acid. Specific preferred examples of these water softeners include ethylenediaminetetraacetic acid, nitrilotriacetic acid, hydroxyethyliminodiacetic acid, propylenediaminetetraacetic acid, diethylenetriaminepentaacetic acid, triethylenetetraminehexaacetic acid, nitrilo-N,N,N-trimethylenephosphonic acid, ethylenediamine-N,N,N',N'-tetramethylenephosphonic acid, 1-hydroxyethylidene-1,1-diphosphonic acid, etc. However, the present invention is not limited to these water softeners. Two or more of these water softeners may be used in combination. The preferred amount of such a water softener to be used is preferably from 0.1 g/l to 20 g/l, particularly from 0.5 g/l to 10 g/l.

The standard black-and-white processing time is 6 minutes. By properly changing the processing time, sensitization or desensitization can be effected. In general, the processing time is varied from 2 to 18 minutes. The processing time is from 20° C. to 50° C., preferably from 33° C. to 45° C. The black-and-white developer to be replenished is from about 100 to 5,000 ml, preferably from about 200 to 2,500 ml per $m^2$ of color reversal film.

The black-and-white development is optionally followed by water washing which is optionally further followed by rinsing. Thereafter, the material is processed at the reversal processing step followed by color development. The water washing or rinsing bath may consist of one bath but may employ a multistage countercurrent process involving two or more baths for the purpose of lowering the replenished amount. The water washing process involves replenishment with a relatively large amount of water while the rinsing process involves replenishment in an amount reduced to the level of other processing baths. The replenishment rate of washing water is preferably from about 3 l to 20 l per $m^2$ of photographic light-sensitive material. The replenishment rate of rinsing bath is preferably from about 0.05 l to 2 l, more preferably from about 100 ml to 500 ml, which means that the amount of water to be used can be drastically reduced as compared with the water washing step. The rinsing bath may comprise an oxidizing agent, a chelating agent, a buffer, a germicide, a fluorescent brightening agent, etc. incorporated therein as necessary. The photographic light-sensitive material which has been subjected to black-and-white development may be washed with a solution which has been introduced from the reversal bath in a countercurrent process without being washed with water or rinsed.

Subsequently, the photographic light-sensitive material is passed to the reversal bath or optical fogging step. The reversal bath may comprise as a chemical fogging agent a known fogging agent, i.e., stannous ion complex salt such as stannous ion-organic phosphoric acid complex salt (U.S. Pat. No. 3,617,282), stannous ion-organic phosphonocarboxylic acid complex salt (Japanese Patent Publication No. 32616/1981) and stannous ion-aminopolycarboxylic acid complex salt (U.S. Pat. No. 1,209,050), stannous ion complex of chelating agent of the general formula (II) or (III) described in Japanese Patent Laid-Open No. 1999-109573, boron compound such as hydrogenated boron compound (U.S. Pat. No. 2,984,567) and heterocyclic amine borane compound (British Patent 1,011,000). The pH value of the reversal bath ranges widely from acidity to alkalinity depending on the kind of the fogging agent used. The pH value of the reversal bath is from 2 to 12, generally from 2.5 to 10, particularly from 3 to 9. The concentration of stannous ion (II) in the reversal bath is from $1\times10^{-3}$ mol/l to $5\times10^{-2}$ mol/l, preferably from $2\times10^{-3}$ mol/l to $1.5\times10^{-2}$ mol/l.

Moreover, the reversal bath preferably comprises propionic acid, acetic acid or an alkylenedicarboxylic acid compound described in the general formula (I) in Japanese Patent Laid-Open No. 1999-109572 incorporated therein to enhance the solubility of tin (II) chelate. Further, the reversal bath preferably comprises as a germicide a sorbitate or quaternary ammonium compound described in U.S. Pat. No. 5,811,225 incorporated therein.

The reversal time is from 10 seconds to 180 seconds, preferably from 20 seconds to 120 seconds, more preferably from 30 seconds to 90 seconds. The reversal bath temperature is equal to or within the temperature of any of the 1st development bath, subsequent rinsing or water washing bath and color development bath, i.e., normally from 20° C. to 50° C., preferably from 33° C. to 45° C. The replenishment rate at the reversal bath is from 10 ml to 2,000 ml, preferably from 200 ml to 150 ml per $m^2$ of color reversal film.

Since the tin (II) chelate in the reversal bath exerts its effect over a wide pH range, it is not particularly necessary that a pH buffer be added to the reversal bath. However, this doesn't prevent an acid, alkali or salt for providing pH buffer capacity such as organic acid (e.g., citric acid, malic acid, maleic acid, succinic acid), inorganic acid (e.g., boric acid, sulfuric acid, hydrochloric acid), carbonic acid alkali, caustic alkali, borax and potassium metaborate from being added to the reversal bath. Further, if necessary, the reversal bath may comprise a water softener such as aminopolycarboxylic acid, a swelling inhibitor such as sodium sulfate or an oxidation inhibitor such as p-aminophenol incorporated therein.

The photographic light-sensitive material which has been processed at the reversal bath is then passed to the color development step. The color developer is an alkaline aqueous solution comprising an aromatic primary amine-based color developing agent incorporated therein as a main component. As such a color developing agent there is preferably used a p-phenylenediamine-based compound. Representative examples of the p-phenylenediamine-based compound include 3-methyl-4-amino-N,N-diethylaniline, 3-methyl-4-amino-N-ethyl-N-β-hydroxyethylaniline, 3-methyl-4-amino-N-ethyl-N-β-methanesulfonamideethylanilin e, 3-methyl-4-amino-N-ethyl-N-N-β-methoxyethylaniline, sulfate, hydrochloride and phosphate thereof, p-toluenesulfonate, tetraphenylborate, p-(t-octyl)benzenesulfonate, etc. Two or more of these developing agents may be used in combination as necessary. The amount of the developing agent to be added is from about 0.005 mol/l to 0.1 mol/l, preferably from about 0.01 mol/l to 0.05 mol/l.

The pH value of the color developer is preferably from 8 to 13, most preferably from 10.0 to 12.5. In order to maintain this pH range, various buffers may be used. Examples of the buffer having a buffering capacity at pH of not lower than 8.0 include carbonate, phosphate, borate, 5-sulfosalicylate, leucine salt, norleucine salt, guanine salt, 3,4-dihydroxyphenylalanine salt, alanine salt, aminobutyrate, 2-amino-2-methyl-1,3-propanediol salt, valine salt, proline salt, trishydroxyaminomethane salt, lysine salt, etc. In particular, carbonate, phosphate and 5-sulfosalicylate are advantageous in that they are excellent in solubility and buffering capacity in a pH range as high as not lower than 10.0, have no adverse effects (e.g., stain) on the photographic properties even when added to the color developer and are inexpensive. Thus, these buffers are preferably used in particular.

Specific examples of these buffers include sodium carbonate, potassium carbonate, sodium bicarbonate, potassium bicarbonate, trisodium phosphate, tripotassium phosphate, disodium phosphate, dipotassium phosphate, dipotassium 5-sulfosalicylate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), potassium 5-sulfo-2-hydroxybenzoate (potassium 5-sulfosalicylate), etc. Preferred among these buffers are trisodium phosphate, tripotassium phosphate, disodium phosphate, disodium phosphate, dipotassium 5-sulfosalicylate, and disodium 5-sulfosalicylate.

These buffers may be added to the color developer, singly or in combination of two or more thereof. The color developer can be adjusted to a desired pH range with an alkaline agent or acid. The amount of the buffer to be added to the color developer (in total when a plurality of buffers are used in combination) is preferably not smaller than 0.1 mol/l, particularly from 0.1 mol/l to 0.4 mol/l.

The color developer may be used in combination with various development accelerators as necessary. Examples of the development accelerator employable herein include various pyridinium compounds as described in U.S. Pat. No. 2,648,604, Japanese Patent Publication No. 9503/1969 and U.S. Pat. No. 3,171,247, other cationic compounds, cationic dyes such as phenosafranine, natural salts such as thallium nitrate and potassium nitrate, polyethylene glycol and derivatives thereof as described in Japanese Patent Publication No. 9304/1969, U.S. Pat. Nos. 2,533,990, 2,531,832, 2,950,970 and 2,577,127, nonionic compounds such as polythioethers, and thioether-based compounds as described in U.S. Pat. No. 3,201,242.

If necessary, the color developer may comprise benzyl alcohol or its solvent such as diethylene glycol, triethanolamine and diethanolamine incorporated therein. Taking into account the environmental burden, solubility thereof, production of tar, etc., however, the use of these solvents is preferably minimized. The color developer may comprise the same silver halide solvent as used in the black-and-white developer. Examples of the silver halide solvent employable herein include thiocyanate, 2-methylimidazole, thioether-based compounds as described in Japanese Patent Laid-Open No. 1982-63580, etc. Particularly preferred among these silver halide solvents is 3,6-dithiaoctane-1,8-diol.

The color developer doesn't need to have an effect of inhibiting development fog. However, in the case where the color reversal film is running with replenishment, the color developer may comprise various fog inhibitors incorporated therein for the purpose of maintaining the invariability of the formulation and properties thereof. Preferred examples of the fog inhibitor to be used at these development steps include halide of alkaline metal such as potassium chloride, sodium chloride, potassium bromide, sodium bromide and potassium iodide, and organic fog inhibitor. Examples of the organic fog inhibitor employable herein include nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, 2-thiazolyl-benzimidazole, 2-thiazolylbenzimidazole and hydroxyazaindolizine, mercapto-substituted heterocyclic compounds such as 1-phenyl-5-mercaptotetrazole, 2-mercaptobenzimidazole and 2-mercaptobenzothiazole, and mercapto-substituted aromatic compounds such as thiosalicylic acid. These fog inhibitors may include those which are eluted from the color reversal film during processing and accumulated in the developer.

The color developer according to the invention may comprise various preservatives incorporated therein. Representative examples of the preservative employable herein include hydroxylamines and sulfites. Preferred among these preservatives are sulfites. The amount of the preservative to be added is from about 0 to 0.1 mol/l. The color developer to be used in the invention may occasionally comprise an organic preservative incorporated therein instead of the foregoing hydroxylamines or sulfites.

The term "organic preservative" as used herein generically means an organic compound which lowers the deterioration rate of the aromatic primary amine color developing agent when added to the processing solution for color photographic light-sensitive material. In other words, an organic compound capable of inhibiting the oxidation of color developing agent by air or the like may be used. In particular, hydroxylamine derivatives (excluding hydroxylamine), hydroxamic acids, hydrazines, hydrazides, phenols, α-hydroxyketones, α-aminoketones, saccharides, monoamines, diamines, polyamines, quaternary ammonium salts, nitroxyradcials, alcohols, oxims, diamide compounds, condensed ring type amines, etc. are useful organic preservatives.

These organic preservatives are disclosed in Japanese Patent Publication No. 30496/1973, Japanese Patent Laid-Open No. 1977-143020, Japanese Patent Laid-Open No. 1988-4235, Japanese Patent Laid-Open No. 1988-30845, Japanese Patent Laid-Open No. 1988-21647, Japanese Patent Laid-Open No. 1988-44655, Japanese Patent Laid-Open No. 1988-53551, Japanese Patent Laid-Open No. 1988-43140, Japanese Patent Laid-Open No. 1988-56654, Japanese Patent Laid-Open No. 1988-58346, Japanese Patent Laid-Open No. 1988-43138, Japanese Patent Laid-Open No. 1988-146041, Japanese Patent Laid-Open No. 1988-44657, Japanese Patent Laid-Open No. 1988-44656, U.S. Pat. Nos. 3,615,503 and 2,494,903, Japanese Patent Laid-Open No. 1989-97953, Japanese Patent Laid-Open No. 1989-186939, Japanese Patent Laid-Open No. 1989-186940, Japanese Patent Laid-Open No. 1989-187557, Japanese Patent Laid-Open No. 1990-306244, etc.

As other preservatives there may be used various metals as described in Japanese Patent Laid-Open No. 1982-44148 and Japanese Patent Laid-Open No. 1982-53749, salicylic acids as described in Japanese Patent Laid-Open No. 1984-180588, amines as described in Japanese Patent Laid-Open No. 1988-239447, Japanese Patent Laid-Open No. 1988-128340, Japanese Patent Laid-Open No. 1989-186939 and Japanese Patent Laid-Open No. 1989-187557, alkanolamines as described in Japanese Patent Laid-Open No. 1979-3532, polyethyleneimines as described in Japanese Patent Laid-Open No. 1981-94349, aromatic polyhydroxy compounds as described in U.S. Pat. No. 3,746,544, etc. as necessary. In particular, alkanolamines such as triethanolamine, dialkylhydroxylamines such as N,N-diethylhydroxylamine and N,N-di(sulfoethyl) hydroxylamine, hydrazine derivatives (excluding hydrazine) such as N,N-bis(carboxymethyl)hydrazine or aromatic polyhydroxy compounds such as sodium catechol-3,5-disulfonate are preferably added.

The amount of such an organic preservative to be added is preferably from about 0.02 mol/l to 0.5 mol/l, more preferably from about 0.05 mol/l to 0.2 mol/l. If necessary, two or more of these organic preservatives may be used in combination.

The color developer according to the invention may further comprise other ingredients incorporated therein such as organic solvent (e.g., diethylene glycol, triethylene glycol), competing coupler (e.g., dye-forming coupler, citrazinic acid, J acid, H acid), nucleator (e.g., sodium boron hydride), auxiliary developing agent (e.g., 1-phenyl-3-pyrazolidone), thickening agent and chelating agent (e.g., aminopolycarboxylic acid such as ethylenediaminetetraacetic acid, nitrilotriacetic acid, cyclohexanediaminetetraacetic acid, hydroxyethyliminodiacetic acid, iminodiacetic acid, N-hydroxymethylethylenediaminetriacetic acid, diethylenetriaminepentaacetic acid, triethylenetetraminehexaacetic acid and compound described in Japanese Patent Laid-Open No. 1983-195845, aminophosphonic acid such as 1-hydroxyethylidene-1,1'-diphosphonic acid, organic phosphonic acid described in Research Disclosure No. 18170 (May 1979), aminotris(methylenephosphonic acid), ethylenediamine-N,N,N',N'-tetramethylenephosphonic acid, phosphonocarboxylic acid described in Japanese Patent Laid-Open No. 1977-102726, Japanese Patent Laid-Open No. 1978-42730, Japanese Patent Laid-Open No. 1979-121127, Japanese Patent Laid-Open No. 1980-4024, Japanese Patent Laid-Open No. 1980-4025, Japanese Patent Laid-Open No. 1980-126241, Japanese Patent Laid-Open No. 1980-65955, Japanese Patent Laid-Open No. 1980-65956, and Research Disclosure No. 18170 (May 1979)).

The amount of the chelating agent to be added is from about 0.05 g/l to 20 g/l, preferably from about 0.1 g/l to 5 g/l. If necessary, two or more of these chelating agents may be used in combination. The color developer may comprise various surface active agents such as alkylsulfonic acid, arylsulfonic acid, aliphatic carboxylic acid and aromatic carboxylic acid polyalkyleneimine incorporated therein as necessary.

The processing temperature with the color developer is from 20° C. to 50° C., preferably from 33° C. to 45° C. The processing time is from 20 seconds to 300 seconds, preferably from 20 seconds to 240 seconds. The replenishment rate at the color development step is preferably minimized so far as the desired activity can be maintained. In practice, however, the replenishment rate is preferably from 100 ml to 2,500 ml, more preferably from 400 ml to 1,200 ml per m² of color reversal film.

The color reversal film which has been subjected to color development is then subjected to desilvering. Desilvering is normally effected in any of the following processes.

1. (Color development)-adjustment-bleach-fixing
2. (Color development)-water washing-bleach-fixing
3. (Color development)-bleach-fixing
4. (Color development)-water washing-bleach-water washing-fixing
5. (Color development)-bleach-water washing-fixing
6. (Color development)-water washing-blix
7. (Color development)-adjustment-blix
8. (Color development)-blix
9. (Color development)-water washing-bleach-blix
10. (Color development)-bleach-blix
11. (Color development)-water washing-bleach-blix-fixing Preferred among these steps are steps 1 and 3. The replenishment in the foregoing processing steps can be carried out by replenishing the various processing baths with the respective replenishers. Alternatively, in the steps 9 and 10, the overflow solution from the bleach bath may be introduced into the blix (bleach-fix) bath which is replenished with the fixing solution composition alone. Alternatively, in the step 11, the overflow solution from the bleach bath may be introduced into the blix bath into which the overflow solution from the fixing bath is introduced in a countercurrent process so that both the two processing solutions overflow from the blix bath.

As the bleaching agent to be used in the bleach bath or blix bath there is most normally used an aminopolycarboxylic acid-iron (III) complex salt. Representative examples of such an aminopolycaroxylic acid and salt thereof include ethylenediaminetetraacetic acid, disodium ethylenediaminetetraacetate, diammonium ethylenediaminetetraacetate, diethylenetriaminepentaacetic acid, cyclohexanediaminetetraacetic acid, disodium cyclohexanediaminetetraacetate, iminodiacetic acid, 1,3-diaminopropanetetraacetic acid, methyliminodiacetic acid, hydroxyethyliminodiacetic acid, glycoletherdiaminetetraacetic acid, ethylenediaminetetrapropionic acid, N-(2-carboxyethyl)-iminodiacetic acid, ethylenediaminedipropionic acid, β-alaninediacetic acid, ethylenediaminedimalonic acid, ethylenediaminedisuccinic acid, propylenediaminedisuccinic acid, etc.

The ferric complex salt of aminopolycarboxylic acid may be used in the form of complex salt. Alternatively, a ferric salt and an aminopolycarboxylic acid may together form a ferric ion complex salt in the solution. Further, one or more aminopolycarboxylic acids may be used. In any case, an aminopolycarboxylic acid may be used in an amount of greater than required to form a ferric ion complex salt. The bleach solution or blix solution containing the foregoing ferric ion complex may comprise a complex salt of metal such as cobalt and copper other than iron incorporated therein. The amount of such a bleaching agent to be added is from 0.02 mols to 0.5 mols, preferably from 0.05 mols to 0.3 mols per liter of the bath having a bleaching capacity.

The bleach bath, blix bath, or adjustment bath, which is a prebath therefor, may comprise various blix accelerators incorporated therein. Examples of such a blix accelerator include various mercapto compounds as described in U.S. Pat. No. 3,893,858, British Patent 1,138,842, and Japanese Patent Laid-Open No. 1978-141623, compounds having disulfide bond as described in Japanese Patent Laid-Open No. 1978-95630, thiazolidine derivatives as described in Japanese Patent Publication No. 9854/1978, isothiourea derivatives as described in Japanese Patent Laid-Open No. 1978-94927, thiourea derivatives as described in Japanese Patent Publication No. 8506/1970 and Japanese Patent Publication No. 26586/1984, thioamide compounds as described in Japanese Patent Laid-Open No. 1974-42349, dithiocarbaminates as described in Japanese Patent Laid-Open No. 1980-26506, etc.

Further examples of the bleach accelerator include alkylmercapto compounds which may be unsubstituted or substituted by hydroxyl group, carboxyl group, sulfonic acid group, amino group (which may have substituents such as alkyl group and acetoxyalkyl group) or the like. Examples of these alkylmercapto compounds include trithioglycerin, α, α'-thiodipropionic acid, δ-mercaptobutyric acid, etc. Moreover, compounds as described in U.S. Pat. No. 4,552,834 may be used.

The amount of the compound having mercapto group or disulfide bond in its molecule, thiazoline derivative or isothiourea derivative to be incorporated in the adjusting solution or bleach bath depends on the kind of the photographic material to be processed, the processing temperature, the time required for desired processing, etc. In practice, however, it is preferably from $1\times10^{-5}$ mol to $10^{-1}$ mol, more preferably from $1\times10^{-4}$ mol to $5\times10^{-2}$ mol per liter of the processing solution.

The adjusting solution preferably comprises an image stabilizer described later incorporated therein. In particular, the adjusting solution preferably comprises a formaldehyde-bisulfurous acid adduct described in U.S. Pat. No. 5,037,725 incorporated therein. Alternatively, the adjusting solution may comprise a binary amine described in U.S. Pat. No. 5,523,195 incorporated therein. The pH value of the adjusting solution is normally from 3 to 11, preferably from 4 to 9, more preferably from 4.5 to 7. The processing time with the adjusting solution is preferably from 20 seconds to 180 seconds, more preferably from 20 seconds to 120 seconds, most preferably from 30 seconds to 60 seconds. The replenishment rate at the adjustment bath is preferably from 30 ml to 2,000 ml, particularly from 50 ml to 1,500 ml per m² of the photographic material. The processing temperature at the adjustment bath is preferably from 20° C. to 50° C., particularly from 30° C. to 40° C.

The bleach bath may comprise a rehalogenating agent such as bromide (e.g., potassium bromide, sodium bromide, ammonium bromide) and chloride (e.g., potassium chloride, sodium chloride, ammonium chloride) incorporated therein besides bleaching agent and the foregoing compounds. The bleach bath may further comprise additives which are known to be normally used in the bleach solution, such as nitrate (e.g., sodium nitrate, ammonium nitrate), one or more inorganic or organic acids or salt thereof having a pH buffering capacity (e.g., boric acid, borax, sodium metaborate, acetic acid, sodium acetate, sodium carbonate, potassium carbonate, phosphorous acid, phosphoric acid, sodium phosphate, citric acid, sodium citrate, tartaric acid). The pH value of the solution having a bleaching capacity is preferably from 4.0 to 8.0, particularly from 5.0 to 7.0 during use.

The blix bath may comprise one or more of thiosulfates such as sodium thiosulfate and ammonium thiosulfate, thiocyanates such as sodium thiocyanate, ammonium thiocyanate and potassium thiocyanate, thioether compounds such as ethylene bisthioglycolic acid and 3,6-dithia-1,8-octanediol and water-soluble silver halide solubilizing agent such as thiourea incorporated therein in admixture. Further, the blix bath may comprise a special blix solution made of fixing agent and a large amount of a halide such as potassium iodide described in Japanese Patent Laid-Open No. 1980-155354 incorporated therein. The amount of such a fixing agent to be added is from 0.1 mols to 3 mols, preferably from 0.2 mols to 2 mols per liter of the bath having a fixing capacity.

As the fixing agent there may be used one or more of known fixing agents such as thiosulfate (e.g., sodium thiosulfate, ammonium thiosulfate), thiocyanate (e.g., sodium thiocyanate, ammonium thiocyanate, potassium thiocyanate), thioether compound (e.g., ethylenebisthioglycolic acid, 3,6-dithia-1,8-octanediol) and water-soluble silver halide solubilizing solvent (e.g., thiourea) in admixture. The concentration of the fixing agent is from 0.1 mols to 3 mols, preferably from 0.2 mols to 2 mols per liter of the fixing solution. The solution having a fixing capacity may comprise as a preservative a sulfite (e.g., sodium sulfite, potassium sulfite, ammonium sulfite), bisulfite, hydroxylamine, hydrazine, bisulfite adduct of aldehyde compound (e.g., sodium acetaldehydebusulfite) or the like incorporated therein besides the foregoing additives. Sulfinic acids (e.g., benzenesulfinic acid) or ascorbic acid, too, are useful preservatives. Further, the fixing bath may comprise various fluorescent brightening agents, antifoaming agents, surface active agents, polyvinylpyrrolidone, antibacterial agents, mildewproofing agents, and organic solvents such as methanol incorporated therein.

The replenishment rate of bleach solution, fixing solution, blix solution, etc. may be arbitrarily predetermined so far as the desired function of the respective processing baths can be satisfied. Preferably, it is preferably from 30 ml to 2,000 ml, more preferably from 50 ml to 1,000 ml per m² of the photographic light-sensitive material. The processing temperature is preferably from 20° C. to 50° C., more preferably from 33° C. to 45° C. The processing time is from 10 seconds to 600 seconds, preferably from 20 seconds to 360 seconds.

The desilvering such as fixing and blix is normally followed by water washing and/or stabilization. The stabilizing solution normally comprises an image stabilizer incorporated therein by may not contain an image stabilizer. The stabilizing solution free of image stabilizer is occasionally referred to as "rinsing solution (washing solution)", which is distinguished from the stabilizing solution. The amount of washing water to be used at the water washing step can be predetermined according to the properties of the photographic light-sensitive material (e.g., due to the materials used such as coupler), usage, temperature of washing water, number of washing baths (number of stages), and other various conditions. Among these factors, the relationship between the number of washing baths and the amount of water to be used in the multi-stage countercurrent process can be determined by the method described in "Journal of the Society of Motion Picture and Television Engineers", vol. 64, pp. 248–253, May 1955. In general, the number of stages in the multi-stage countercurrent process is preferably from 2 to 15, particularly from 2 to 10.

In accordance with the multi-stage countercurrent process, the amount of washing water to be used can be drastically decreased. However, since the residence time of water in the baths increases, bacteria proliferate to produce suspended matters which are then attached to the photographic light-sensitive material or cause other problems. As a solution to such a problem, the method involving the reduction of calcium and magnesium content described in Japanese Patent Laid-Open No. 1987-288838 can be used extremely effectively. Alternatively, isothiazolone compounds or thiabendazoles as described in Japanese Patent Laid-Open No. 1982-8542, chlorine-based germicides such as chlorinated sodium isocyanurate as described in Japanese Patent Laid-Open No. 1987-120145, benzotriazole as described in Japanese Patent Laid-Open No. 1986-267761, copper ion, and germicides as described in Hiroshi Horiguchi, "Boukin Bobai no kagaku (Antibacterial and antifungal chemistry)", Sankyo Shuppan, compiled by Eisei Gijutukai, "Biseibutu no mekkin, sakkin, boubai gijutu", Kogyo Gijutukai, 1982, and "Boukin Boubaizai Jiten (Dictionary of antibacterial and antifungal agents)", Nippon Boukin Boubai Gakkai (The Society for Antibacterial and Antifungal Agents, Japan), 1986 may be used.

Further, aldehydes such as formaldehyde, acetaldehyde and pyruvic aldehyde, which inactivate remaining magenta coupler to inhibit the discoloration of dyes or the production of stain, methylol compounds or hexamethylenetetramine as described in U.S. Pat. No. 4,786,583, hexahydrotriazines as described in Japanese Patent Laid-Open No. 1990-153348, formaldehyde-bisulfurous acid adduct as described in U.S. Pat. No. 4,921,779, azorylmethylamines as described in European Patent Disclosure Nos. 504,609 and 519,190, etc. may be added.

As described in U.S. Pat. Nos. 4,960,687, 4,975,356, and 5,037,725, it is preferred that the adjusting solution comprise an image stabilizer or precursor thereof incorporated therein while the stabilizing solution (rinsing solution) be free of such an image stabilizer so that the production of stain and unevenness on the surface of the film thus processed can be minimized.

Further, the washing water, stabilizing solution or rinsing solution may comprise a surface active agent as a dehydrating agent or a chelating agent such as EDTA as a water softener incorporated therein. Examples of such a surface active agent include polyethylene glycol type nonionic surface active agents, polyvalent alcohol type nonionic surface active agents, alkylbenzenesulfonate type anionic surface active agents, higher alcohol sulfuric acid ester salt type anionic surface active agents, alkylnaphthalenesuolfonate type anionic surface active agents, quaternary ammonium salt type cationic surface active agents, amine salt type cationic surface active agents, amino salt amphoteric surface active agents, and betaine type amphoteric surface active agents. Two or more of these surface active agents may be used in combination. Further, fluorine-based surface active agents or siloxane-based surface active agents as described in U.S. Pat. No. 5,716,765 may be used.

Preferred among these nonionic surface active agents are alkylpolyethylene oxides, alkylphenoxypolyethylene oxides, and alkylphenoxypolyhydroxypropylene oxides. Particularly preferred among these nonionic surface active agents are alkyl-polyethylene oxide (5–12) alcohols having from 8 to 15 carbon atoms. In order to enhance the solubility of the surface active agent, the washing water, stabilizing solution or rinsing solution preferably comprises a solubilizing agent such as amine (e.g., diethanolamine, triethanolamine) and glycol (e.g., diethylene glycol, propylene glycol) incorporated therein.

The stabilizing solution or rinsing solution preferably comprises a chelating agent for collecting heavy metal incorporated therein for the purpose of improving the stability thereof and minimizing the production of stain. As such a chelating agent there may be used the same compound as incorporated in the foregoing developer and bleach bath. The stabilizing solution or rinsing solution of the invention preferably comprises an antibacterial and antifungal agents incorporated therein for the purpose of inhibiting the proliferation of bacteria or fungi. As such antibacterial and antifungal agents there may be used commercially available products. The stabilizing solution or rinsing solution may further comprise a surface active agent, a fluorescent brightening agent and a hardener incorporated therein.

The pH value of the stabilizing solution or rinsing solution and washing water is from 4 to 9, preferably from 5 to 8. The processing temperature and processing time can be arbitrarily predetermined according to the properties, purpose, etc. of the photographic light-sensitive material. In practice, however, the processing is effected at a temperature of from 15° C. to 45° C. for 20 seconds to 600 seconds, preferably at a temperature of from 25° C. to 40° C. for 30 seconds to 120 seconds. Further, the stabilizing solution or rinsing solution of the invention exerts a remarkable effect of inhibiting stain in the case where the photographic light-sensitive material which has been desilvered is immediately processed with the stabilizing solution or rinsing solution free from water washing. The replenishment rate of the stabilizing solution or rinsing solution is preferably from 200 ml to 2,000 ml per m$^2$ of the photographic light-sensitive material. The overflow solution produced by the replenishment of the foregoing washing water and/or stabilizing solution can be re-used at other steps such as desilvering step.

In order to reduce the amount of washing water to be used, ion exchange or ultrafiltration may be used, preferably ultrafiltration in particular. The various processing solutions in the invention are used at a temperature of from 10° C. to 50° C. In general,, a temperature of from 33° C. to 38° C. is standard. However, the processing temperature may be raised to accelerate processing and hence reduce the processing time. On the contrary, the processing temperature may be lowered to realize the improvement of image quality or the improvement of stability of the processing solutions.

In the case where the processing of the color reversal film involves stabilization free from water washing step, any of known methods described in Japanese Patent Laid-Open No. 1982-8543, Japanese Patent Laid-Open No. 1983-14834, Japanese Patent Laid-Open No. 1985-220345, etc. may be employed. Other preferred embodiments include the use of a chelating agent such as 1-hydroxyethylidene-1,1-diphosphonic acid and ethylenediaminetetramethylenephosphonic acid or a magnesium or bismuth compound.

The water washing and/or stabilizing step is immediately followed by drying. From the standpoint of reduction of amount of water content to be carried over into the image film, the color reversal film which has come out of the water washing bath may be immediately wiped dry with a squeeze roller or cloth so that water is absorbed to speed drying. Referring to improvement for the part of the drying machine, it is a matter of course that the drying temperature can be raised or the shape of nozzle can be modified to strengthen drying air, speeding drying. Alternatively, as proposed in Japanese Patent Laid-Open No. 1992-157650, the angle of drying air blowing onto the photographic light-sensitive can be properly adjusted or the drying air which has been used can be properly removed to speed drying.

The color reversal film to be processed with the antifoaming agent of the invention will be further described hereinafter. The color reversal film of the invention is a silver halide color photographic material normally comprising a red-sensitive unit, a green-sensitive unit and a blue-sensitive unit in the order of closeness to the support and one or more non-color developable layers provided interposed at least either between the red-sensitive unit and the green-sensitive unit or between the green-sensitive unit and the blue-sensitive unit.

The photographic light-sensitive material having three light-sensitive units preferably comprises a low sensitivity emulsion layer, a middle sensitivity emulsion layer and a high sensitivity emulsion layer provided in the order of closeness to the support. A non-color developable interlayer or a layer containing a silver halide emulsion may be provided interposed between these light-sensitive emulsion layers. The blue-sensitive, green-sensitive and red-sensitive units each preferably consist of three layers. However, the blue-sensitive layer may consist of two or less layers and the green-sensitive and red-sensitive layers each may consist of three layers. The blue-sensitive layer, green-sensitive and red-sensitive layers contain a yellow coupler, a magenta coupler and a cyan coupler, respectively. However, these couplers may be used in different combinations for the purpose of adjusting color reproducibility.

In the three-layer unit, the proportion of coated amount of silver halide emulsion in the total coated weight of silver halide emulsion in the entire unit is preferably from 10% to 60% for high sensitivity layer, from 10% to 50% for middle sensitivity layer and from 30% to 70% for low sensitivity layer. The silver/coupler ratio in the various light-sensitive layers are preferably arranged such that it is maximum in the low sensitivity layer.

A non-color developable interlayer is preferably provided between units having different color sensitivities. The non-color developable interlayer may comprise a light-sensitive, non-light sensitive or previously fogged silver halide emulsion incorporated therein. In particular, the interlayer preferably consists of two or five layers. In this case, the layer disposed remote from the support preferably comprises a particulate silver halide or a previously surface- or internally fogged silver halide emulsion incorporated therein. In the case where the interlayer comprises a silver halide emulsion incorporated therein, a stain inhibitor is preferably incorporated in the interlayer or layers adjacent thereto.

A preferred example of the color reversal film will be described below. A red-sensitive unit, a green-sensitive unit and a blue-sensitive unit are provided in the order of closeness to the support. At least the red-sensitive unit and the green-sensitive unit each consist of three light-sensitive emulsion layers which are provided in the order of low sensitivity layer, middle sensitivity layer and high sensitivity layer from the support. The silver/coupler ratio is maximum in the low sensitivity layer among the various light-sensitive layers. In particular, the silver/coupler ratio in the green-sensitive emulsion layer, which has the highest luminosity, is preferably from 25 to 150. In this case, the silver/coupler ratio in the middle sensitivity layer and high sensitivity layer are preferably from 5 to 30 and from 2 to 20, respectively.

Further, two to five interlayers are provided interposed between the red-sensitive unit and the green-sensitive unit and between the green-sensitive unit and the blue-sensitive unit. A particulate silver halide or a previously fogged silver halide emulsion is incorporated in the layers adjacent to the green-sensitive layer and the layers adjacent to the blue-sensitive layer. The total thickness of the foregoing interlayers is from 0.5 $\mu$m to 5 $\mu$m, preferably from 1.0 $\mu$m to 3.0 $\mu$m. The thickness of these layers can be easily determined theoretically by the specific gravity of the additives. The actual coating materials can be easily measured by observing the section thereof under electron microscope.

Further, it is preferred that an antihalation layer and an interlayer be provided closer to the support than the red-sensitive unit, at least one protective layer be provided further from the support than the blue-sensitive unit and at least one of the protective layers contain a silver halide emulsion. For the details of silver halide photographic emulsion, and various techniques and inorganic and organic materials employable in silver halide photographic materials comprising a silver halide photographic emulsion, reference can be normally made to Research Disclosure No. 308119 (1989).

In addition to the above cited reference, silver halide photographic emulsion, and various techniques and inorganic and organic materials employable in silver halide photographic materials comprising a silver halide photographic emulsion are described in the following sites in European Patent No. 436,938A and the patents cited below.

| Structure, material and step | Site |
|---|---|
| 1) Layer structure: | Line 34, page 146–line 25, page 147 |
| 2) Silver halide emulsion: | Line 26, page 147–line 12, page 148 |
| 3) Yellow coupler: | Line 35, page 137–line 33, page 146; line 21–line 21, page 149 |
| 4) Magenta coupler: | Line 24–line 28, page 149; line 5, page 3–line 55, page 25 of European Patent Number 421,453A1 |
| 5) Cyan coupler: | Line 29–line 33, page 149; line 28, page 3–line 2, page 40 of European Patent Number 432,804A2 |
| 6) Polymer coupler: | Line 34–line 38, page 149; line 39, page 113–line 37, page 123 of European Patent Number 435,334A2 |
| 7) Colored coupler: | Line 42, page 53—line 34, page 137; line 39–line 45, page 149 |

-continued

| Structure, material and step | Site |
|---|---|
| 8) Other functional couplers: | Line 1, page 7–line 41, page 53; line 46, page 149–line 3, page 150; line 1, page 3–line 50, page 29 of European Patent Number 435,334A2 |
| 9) Preservative/antifungal agent: | Line 25–line 28, page 150 |
| 10) Formalin scavenger: | Line 15–line 17, page 149 |
| 11) Other additives: | Line 38–line 47, page 153; line 21, page 75–line 56, page 84 of European Patent Number 421,453A1 |
| 12) Dispersion process: | Line 4–line 24, page 150 |
| 13) Support: | Line 32–line 34, page 150 |
| 14) Layer thickness/layer physical properties: | Line 35–line 49, page 150 |
| 15) Color/Black-and-white development: (development/fogging step): | Line 50, page 150–line 47, page 151; line 11–line 54, page 34 and line 14–line 22, page 35 of European Patent Number 442,323A2 |
| 16) Desilvering step: | Line 48, page 151–line 5, page 152 |
| 17) Automatic developing machine: | Line 54, page 152–line 2, page 153 |
| 18) Water washing/stabilizing step: | Line 3–line 37, page 153 |

EXAMPLE 1

The present invention will be further described in the following examples, but the present invention should not be construed as being limited thereto.

(1) Preparation of Photographic Light-Sensitive Material

Preparation of Sample 101

Various layers having the following formulations were formed on an undercoated cellulose triacetate film support having a thickness of 127 $\mu$m to prepare a multi-layer color photographic light-sensitive material as Sample 101. The figure in the following formulations each indicate the amount added per m$^2$.

| 1st layer: Antihalation layer | |
|---|---|
| Black colloidal silver halide | 0.25 g |
| Gelatin | 2.40 g |
| Ultraviolet absorber U-1 | 0.10 g |
| Ultraviolet absorber U-3 | 0.10 g |
| Ultraviolet absorber U-4 | 0.10 g |
| High boiling organic solvent Oil-1 | 0.050 g |
| High boiling organic solvent Oil-2 | 0.050 g |
| High boiling organic solvent Oil-5 | 0.010 g |
| Dye D-4 | 1.0 mg |
| Dye D-8 | 2.5 mg |
| Microcrystalline solid dispersion of Dye E-1 | 0.05 g |
| 2nd layer: Interlayer | |
| Gelatin | 0.40 g |
| Compound Cpd-A | 0.2 mg |
| Compound Cpd-J | 1.0 mg |
| Compound Cpd-K | 3.0 mg |
| Compound Cpd-M | 0.030 g |
| Ultraviolet absorber U-6 | 6.0 mg |
| High boiling organic solvent Oil-3 | 0.010 g |
| High boiling organic solvent Oil-4 | 0.010 g |
| High boiling organic solvent Oil-7 | 2.0 mg |
| High boiling organic solvent Oil-8 | 4.0 mg |
| Dye D-7 | 4.0 mg |

3rd layer: Interlayer

| | |
|---|---|
| Yellow colloidal silver | 0.010 g |
| Gelatin | 0.50 g |
| Compound Cpd-M | 0.010 g |
| High boiling organic solvent Oil-3 | 0.010 g |

4th layer: Low sensitivity red-sensitive emulsion layer

| | |
|---|---|
| Emulsion A | 0.20 g (in silver equivalence) |
| Emulsion B | 0.20 g (in silver equivalence) |
| Emulsion C | 0.15 g (in silver equivalence) |
| Gelatin | 0.70 g |
| Coupler C-1 | 0.050 g |
| Coupler C-2 | 0.080 g |
| Coupler C-3 | 0.010 g |
| Coupler C-6 | 6.0 mg |
| Coupler C-9 | 5.0 mg |
| Coupler C-11 | 0.030 g |
| Ultraviolet absorber U-1 | 0.010 g |
| Ultraviolet absorber U-2 | 0.010 g |
| Compound Cpd-A | 1.0 mg |
| Compound Cpd-I | 0.020 mg |
| Compound Cpd-J | 2.0 mg |
| High boiling organic solvent Oil-2 | 0.10 g |
| High boiling organic solvent Oil-5 | 0.010 g |
| Additive P-1 | 0.020 g |

5th layer: Middle sensitivity red-sensitive emulsion layer

| | |
|---|---|
| Emulsion C | 0.25 g (in silver equivalence) |
| Emulsion D | 0.25 g (in silver equivalence) |
| Gelatin | 0.60 g |
| Coupler C-1 | 0.040 g |
| Coupler C-2 | 0.10 g |
| Coupler C-3 | 0.020 g |
| Coupler C-6 | 7.0 mg |
| Coupler C-11 | 0.050 g |
| Ultraviolet absorber U-1 | 0.010 g |
| Ultraviolet absorber U-2 | 0.010 g |
| High boiling organic solvent Oil-2 | 0.10 g |
| Additive P-1 | 0.020 g |

6th layer: High sensitivity red-sensitive emulsion layer

| | |
|---|---|
| Emulsion E | 0.25 g (in silver equivalence) |
| Emulsion F | 0.35 g (in silver equivalence) |
| Gelatin | 1.50 g |
| Coupler C-1 | 0.10 g |
| Coupler C-3 | 0.60 g |
| Coupler C-6 | 0.010 g |
| Coupler C-11 | 0.20 g |
| Ultraviolet absorber U-1 | 0.010 g |
| Ultraviolet absorber U-2 | 0.010 g |
| High boiling organic solvent Oil-2 | 0.10 g |
| High boiling organic solvent Oil-9 | 0.010 g |
| Compound Cpd-K | 1.0 mg |
| Compound Cpd-L | 1.0 mg |
| Compound Cpd-F | 0.050 g |
| Additive P-1 | 0.10 g |

7th layer: Interlayer

| | |
|---|---|
| Gelatin | 0.70 g |
| Additive P-2 | 0.10 g |
| Compound Cpd-I | 0.010 g |
| Dye D-5 | 0.020 g |
| Dye D-9 | 6.0 mg |
| Compound Cpd-M | 0.040 g |
| Compound Cpd-O | 3.0 mg |
| Compound Cpd-P | 5.0 mg |
| High boiling organic solvent Oil-6 | 0.050 g |

8th layer: Interlayer

| | |
|---|---|
| Yellow colloidal silver | 0.010 g (in silver equivalence) |
| Gelatin | 1.00 g |
| Additive P-2 | 0.05 g |
| Ultraviolet absorber U-1 | 0.010 g |
| Ultraviolet absorber U-3 | 0.010 g |
| Compound Cpd-A | 0.050 g |
| Compound Cpd-M | 0.050 g |
| High boiling organic solvent Oil-3 | 0.10 g |
| High boiling organic solvent Oil-6 | 0.050 g |

9th layer: Low sensitivity green-sensitive emulsion layer

| | |
|---|---|
| Emulsion G | 0.20 g (in silver equivalence) |
| Emulsion H | 0.35 g (in silver equivalence) |
| Emulsion I | 0.30 g (in silver equivalence) |
| Gelatin | 1.50 g |
| Coupler C-4 | 0.020 g |
| Coupler C-7 | 0.070 g |
| Coupler C-8 | 0.070 g |
| Coupler C-12 | 0.020 g |
| Coupler C-13 | 0.010 g |
| Compound Cpd-B | 0.030 g |
| Compound Cpd-D | 5.0 mg |
| Compound Cpd-E | 5.0 mg |
| Compound Cpd-G | 2.5 mg |
| Compound Cpd-F | 0.010 g |
| Compound Cpd-K | 2.0 mg |
| Ultraviolet absorber U-6 | 5.0 mg |
| High boiling organic solvent Oil-2 | 0.15 g |
| High boiling organic solvent Oil-6 | 0.030 g |
| High boiling organic solvent Oil-4 | 8.0 mg |
| Additive P-1 | 5.0 mg |

10th layer: Middle sensitivity green-sensitive emulsion layer

| | |
|---|---|
| Emulsion I | 0.30 g (in silver equivalence) |
| Emulsion J | 0.30 g (in silver equivalence) |
| Internally-fogged silver bromide emulsion (cubic; average particle diameter in sphere equivalence: 0.11 μm) | 5.0 mg (in silver equivalence) |
| Gelatin | 0.70 g |
| Coupler C-4 | 0.30 g |
| Coupler C-8 | 0.020 g |
| Coupler C-12 | 0.020 g |
| Coupler C-13 | 0.010 g |
| Compound Cpd-B | 0.030 g |
| Compound Cpd-F | 0.010 g |
| Compound Cpd-G | 2.0 mg |
| High boiling organic solvent Oil-2 | 0.050 g |
| High boiling organic solvent Oil-5 | 6.0 mg |

11th layer: High sensitivity green-sensitive emulsion layer

| | |
|---|---|
| Emulsion K | 0.55 g (in silver equivalence) |
| Gelatin | 0.70 g |
| Coupler C-3 | 5.0 mg |
| Coupler C-4 | 0.35 g |
| Coupler C-8 | 0.010 g |
| Coupler C-12 | 0.020 g |
| Compound Cpd-B | 0.050 g |
| Compound Cpd-F | 0.010 g |
| Compound Cpd-K | 2.0 mg |

-continued

| | |
|---|---|
| High boiling organic solvent Oil-2 | 0.050 g |
| 12th layer: Interlayer | |
| Gelatin | 0.30 g |
| Compound Cpd-M | 0.05 g |
| High boiling organic solvent Oil-3 | 0.025 g |
| High boiling organic solvent Oil-6 | 0.025 g |
| Dye D-6 equivalent | 5.0 mg |
| 13th layer: Yellow filter layer | |
| Yellow colloidal silver | 0.050 g (in silver equivalence) |
| Gelatin | 0.70 g |
| Compound Cpd-C | 0.010 g |
| Compound Cpd-M | 0.030 g |
| High boiling organic solvent Oil-1 | 0.020 g |
| High boiling organic solvent Oil-6 | 0.030 g |
| Microcrystalline solid dispersion of Dye E-2 | 0.030 g |
| 14th layer: Interlayer | |
| Gelatin | 0.30 g |
| Compound Cpd-Q | 0.20 g |
| 15th layer: Low sensitivity blue-sensitive emulsion layer | |
| Emulsion L | 0.20 g (in silver equivalence) |
| Emulsion M | 0.20 g (in silver equivalence) |
| Gelatin | 0.80 g |
| Coupler C-5 | 0.30 g |
| Coupler C-6 | 0.010 g |
| Coupler C-10 | 0.030 g |
| Compound Cpd-I | 8.0 mg |
| Compound Cpd-K | 1.0 mg |
| Compound Cpd-M | 5.0 mg |
| Ultraviolet absorber U-6 | 0.010 mg |
| High boiling organic solvent Oil-2 | 0.010 g |
| High boiling organic solvent Oil-3 | 0.010 g |
| 16th layer: Middle sensitivity blue-sensitive emulsion layer | |
| Emulsion N | 0.20 g (in silver equivalence) |
| Emulsion O | 0.20 g (in silver equivalence) |
| Internally-fogged silver bromide emulsion (cubic; average particle diameter in sphere equivalence: 0.11 μm) | 0.010 g (in silver equivalence) |
| Gelatin | 0.90 g |
| Coupler C-5 | 0.50 g |
| Coupler C-6 | 0.020 g |
| Coupler C-10 | 0.060 g |
| Compound Cpd-N | 2.0 mg |
| High boiling organic solvent Oil-2 | 0.080 g |
| 17th layer: High sensitivity blue-sensitive emulsion layer | |
| Emulsion O | 0.20 g (in silver equivalence) |
| Emulsion P | 0.25 g (in silver equivalence) |
| Gelatin | 2.00 g |
| Coupler C-3 | 5.0 mg |
| Coupler C-5 | 0.20 g |
| Coupler C-6 | 0.020 g |
| Coupler C-10 | 1.00 g |
| High boiling organic solvent Oil-2 | 0.10 g |
| High boiling organic solvent Oil-6 | 0.020 g |
| Ultraviolet absorber U-6 | 0.10 g |
| Compound Cpd-B | 0.20 g |
| Compound Cpd-N | 5.0 mg |

-continued

| | |
|---|---|
| 18th layer: 1st protective layer | |
| Gelatin | 0.80 g |
| Ultraviolet absorber U-1 | 0.10 g |
| Ultraviolet absorber U-2 | 0.050 g |
| Ultraviolet absorber U-5 | 0.20 g |
| Compound Cpd-O | 5.0 mg |
| Compound Cpd-A | 0.030 g |
| Compound Cpd-H | 0.20 g |
| Dye D-1 | 8.0 mg |
| Dye D-2 | 0.010 g |
| Dye D-3 | 0.010 g |
| High boiling organic solvent Oil-3 | 0.10 g |
| 19th layer: 2nd protective layer | |
| Colloidal silver | 0.11 mg (in silver equivalence) |
| Emulsion of particulate silver bromoiodide (average particle diameter: 0.06 μm; AgI content: 1 mol %) | 0.10 g (in silver equivalence) |
| Gelatin | 0.70 g |
| Ultraviolet absorber U-1 | 0.010 g |
| Ultraviolet absorber U-6 | 0.010 g |
| High boiling organic solvent Oil-3 | 0.010 g |
| 20th layer: 3rd protective layer | |
| Gelatin | 1.00 g |
| Polymethyl methacrylate (average particle diameter: 1.5 μm) | 0.10 g |
| 6:4 Copolymer of methyl methacrylate and methacrylic acid (average particle diameter: 1.5 μm) | 0.10 g |
| Silicone oil SO-1 | 0.10 g |
| Surface active agent W-1 | 3.0 mg |
| Surface active agent W-2 | 8.0 mg |
| Surface active agent W-3 | 0.040 g |
| Surface active agent W-7 | 0.015 g |

All the emulsion layers comprised additives F-1 to F-8 incorporated therein besides the foregoing compositions. The various layers comprised a gelatin hardener H-1 and coating or emulsifying surface active agents W-3, W-4, W-5 and W-6 incorporated therein besides the foregoing compositions.

As preservatives and antifungal agents there were added phenol, 1,2-benzisothiazoline-3-one, 2-phenoxyethanol, phenethyl alcohol, and butylester p-benzoate.

TABLE 1

Emulsion used in Sample 101

| Emulsion No. | Characteristics | Average particle diameter (μm) in sphere equivalence | Coefficient of variation (%) | AgI content (%) |
|---|---|---|---|---|
| A | Monodisperse tetradecahedral particle | 0.13 | 10 | 4.5 |
| B | Monodisperse (111) plane internal latent image type tabular particle (average aspect ratio: 2.0) | 0.25 | 10 | 4.8 |
| C | Monodisperse (111) plane tabular particle (average aspect ratio: 2.0) | 0.30 | 10 | 4.0 |

TABLE 1-continued

Emulsion used in Sample 101

| Emulsion No. | Characteristics | Average particle diameter (μm) in sphere equivalence | Coefficient of variation (%) | AgI content (%) |
|---|---|---|---|---|
| D | Monodisperse (111) plane tabular particle (average aspect ratio: 3.0) | 0.35 | 12 | 4.8 |
| E | Monodisperse (111) plane tabular particle (average aspect ratio: 3.0) | 0.40 | 10 | 2.5 |
| F | Monodisperse (111) plane tabular particle (average aspect ratio: 4.5) | 0.55 | 12 | 2.5 |
| G | Monodisperse cubic particle | 0.15 | 9 | 3.5 |
| H | Monodisperse cubic internal latent type particle | 0.24 | 12 | 4.9 |
| I | Monodisperse (111) plane tabular particle (average aspect ratio: 4.0) | 0.30 | 12 | 3.5 |
| J | Monodisperse (111) plane tabular particle (average aspect ratio: 5.0) | 0.45 | 10 | 3.0 |
| K | Monodisperse (111) plane tabular particle (average aspect ratio: 5.5) | 0.60 | 13 | 3.5 |
| L | Monodisperse tetradecahedral particle | 0.33 | 10 | 4.5 |
| M | Monodisperse (111) plane tabular particle (average aspect ratio: 3.0) | 0.33 | 9 | 6.0 |
| N | Monodisperse (111) plane tabular particle (average aspect ratio: 3.0) | 0.43 | 9 | 2.5 |
| O | Monodisperse (111) plane tabular particle (average aspect ratio: 6.0) | 0.75 | 9 | 3.0 |
| P | Monodisperse (111) plane tabular particle (average aspect ratio: 6.0) | 0.90 | 8 | 2.8 |

TABLE 2

Spectral sensitization of Emulsions A to P

| Emulsion | Added spectral sensitizing dye | Amount added per mol of silver halide (g) |
|---|---|---|
| A | S-1 | 0.01 |
|   | S-2 | 0.35 |
|   | S-3 | 0.02 |
|   | S-8 | 0.03 |
|   | S-13 | 0.015 |
|   | S-14 | 0.01 |
| B | S-2 | 0.35 |
|   | S-3 | 0.02 |
|   | S-8 | 0.03 |
|   | S-13 | 0.015 |
|   | S-14 | 0.01 |
| C | S-2 | 0.45 |
|   | S-3 | 0.04 |
|   | S-8 | 0.04 |
|   | S-13 | 0.02 |
| D | S-2 | 0.5 |
|   | S-3 | 0.05 |
|   | S-8 | 0.05 |
|   | S-13 | 0.015 |
| E | S-1 | 0.01 |
|   | S-2 | 0.45 |
|   | S-3 | 0.05 |
|   | S-8 | 0.05 |
|   | S-13 | 0.01 |
| F | S-2 | 0.4 |
|   | S-3 | 0.04 |
|   | S-8 | 0.04 |
| G | S-4 | 0.3 |
|   | S-5 | 0.05 |
|   | S-12 | 0.1 |
| H | S-4 | 0.2 |
|   | S-5 | 0.05 |
|   | S-9 | 0.15 |
|   | S-14 | 0.02 |
| I | S-4 | 0.3 |
|   | S-9 | 0.2 |
|   | S-12 | 0.1 |

TABLE 3

Spectral sensitization of Emulsions A to P (continued from above)

| Emulsion | Added spectral sensitizing dye | Amount added per mol of silver halide (g) |
|---|---|---|
| J | S-4 | 0.35 |
|   | S-5 | 0.05 |
|   | S-12 | 0.1 |
| K | S-4 | 0.3 |
|   | S-9 | 0.05 |
|   | S-12 | 0.1 |
|   | S-14 | 0.02 |
| L | S-6 | 0.1 |
|   | S-10 | 0.2 |
|   | S-11 | 0.05 |
| M | S-6 | 0.05 |
|   | S-7 | 0.05 |
|   | S-10 | 0.25 |
|   | S-11 | 0.05 |
| N | S-10 | 0.4 |
|   | S-11 | 0.15 |
| O | S-6 | 0.05 |
|   | S-7 | 0.05 |
|   | S-10 | 0.3 |
|   | S-11 | 0.1 |
| P | S-6 | 0.05 |
|   | S-7 | 0.05 |
|   | S-10 | 0.2 |
|   | S-11 | 0.25 |

C-1
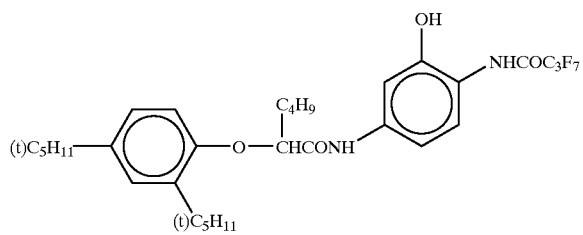
C-2
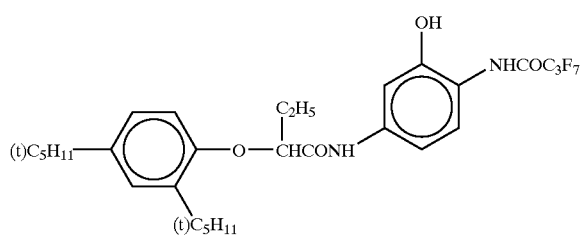
C-3
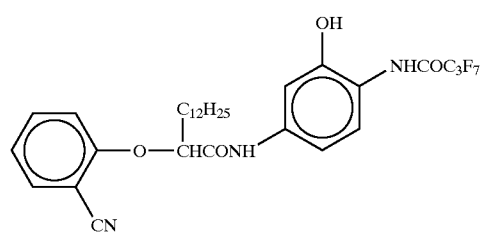
C-4
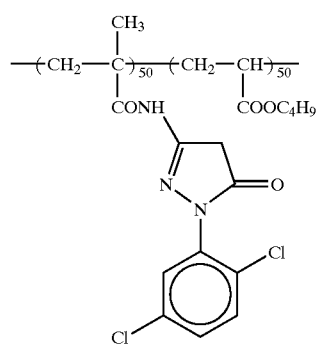
The figure indicates % by weight. Average molecular weight: approx. 25,000
C-5
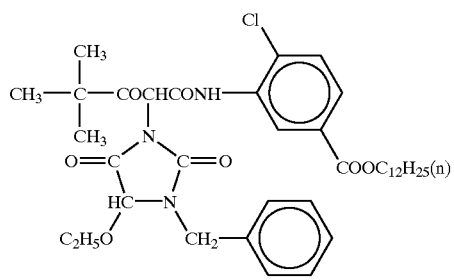

-continued
C-6
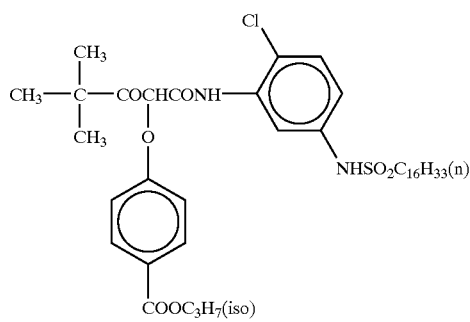
C-7
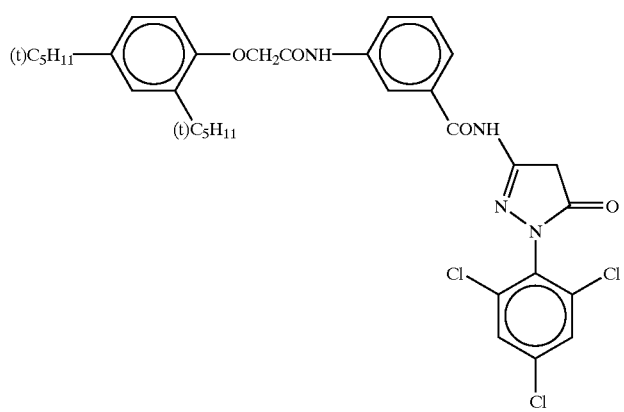
C-8
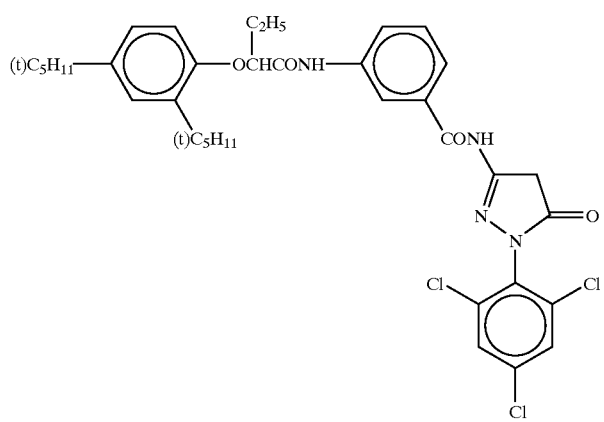
C-9
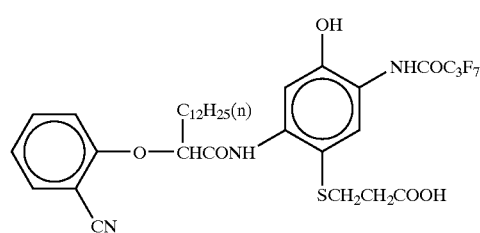

-continued
C-10
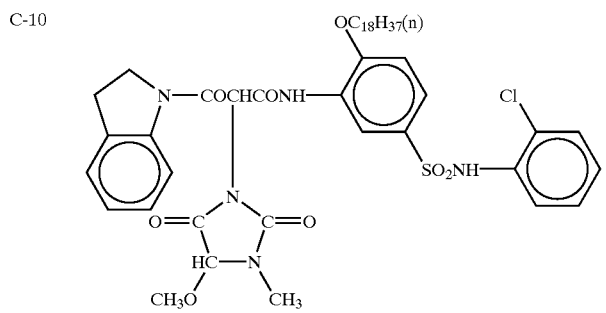
C-11
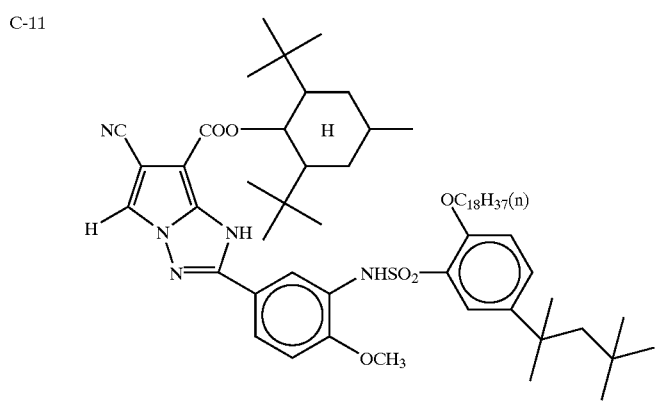
C-12
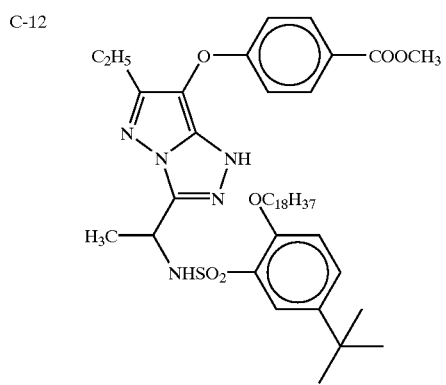
C-13
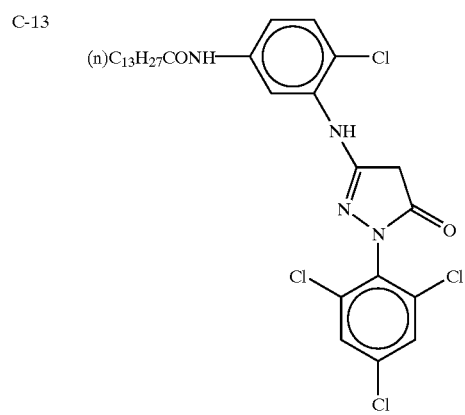
| | | | |
|---|---|---|---|
| Oil-1 | Tri-n-hexyl phosphate | Oil-2 | Tricresyl phosphate |
| Oil-3 |  | Oil-4 | Tricyclohexyl phosphate |
| Oil-5 | Di-2-ethylhexyl succinate | Oil-6 | 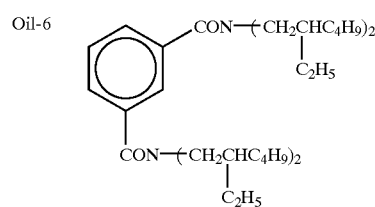 |

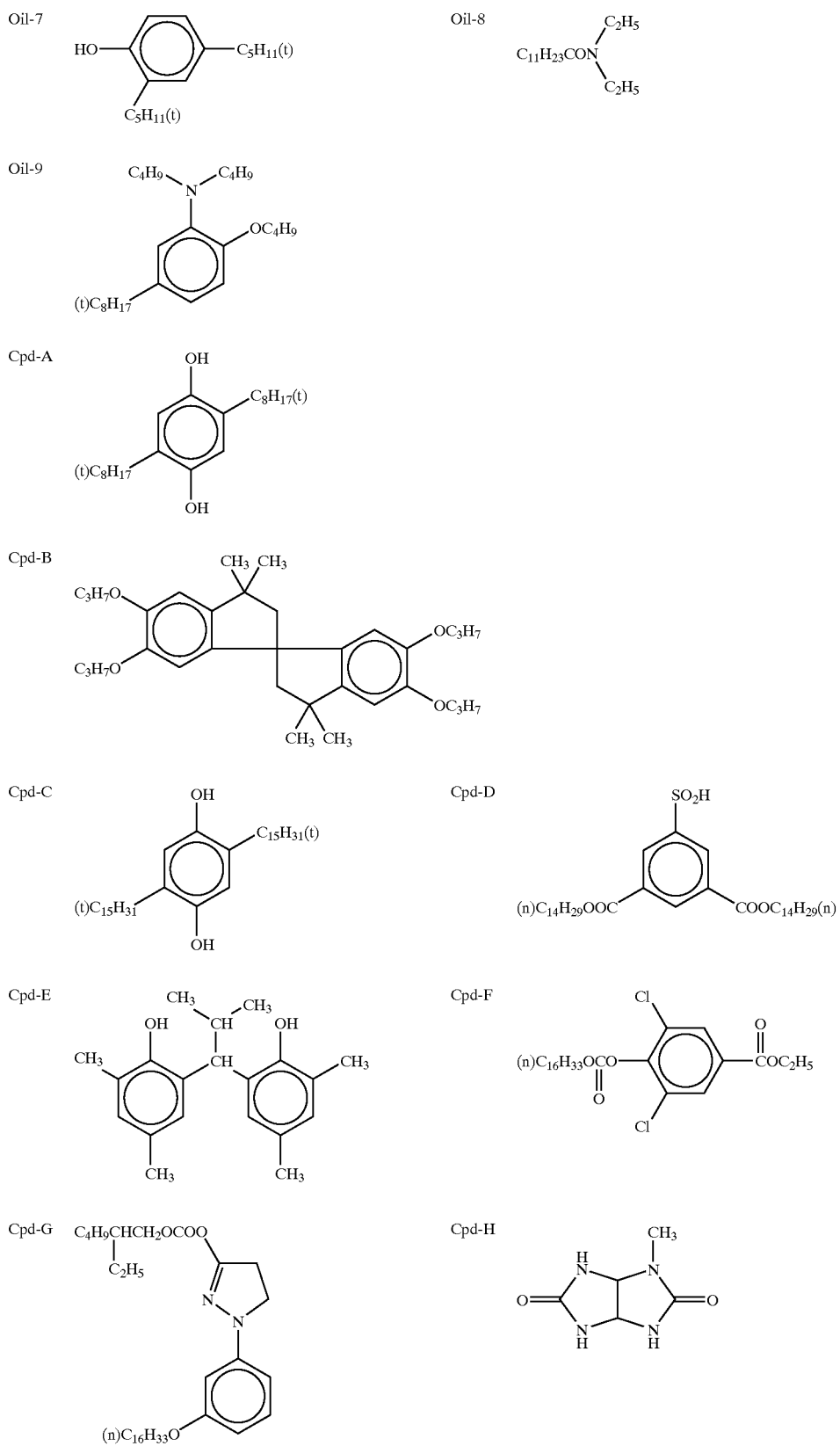

-continued
Cpd-I
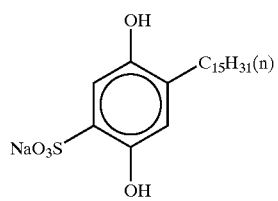
Cpd-J
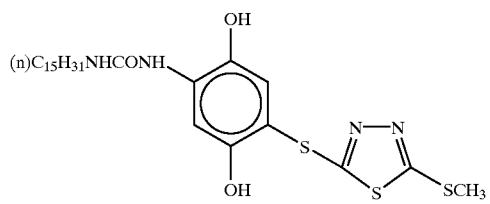
Cpd-K
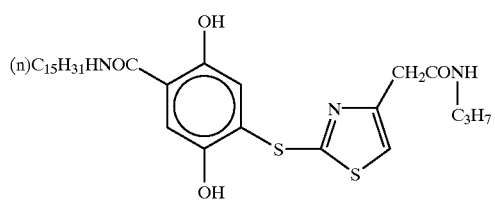
Cpd-L
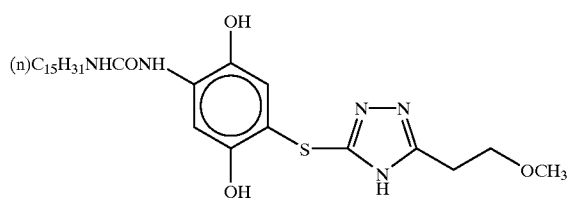
Cpd-M
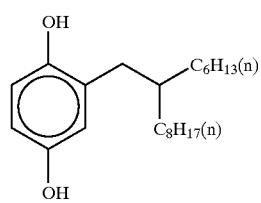
Cpd-N
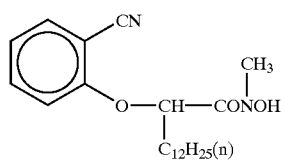
Cpd-O
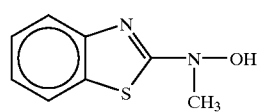
Cpd-P
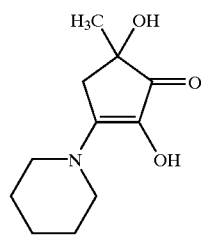
Cpd-Q
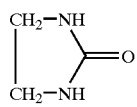
U-1
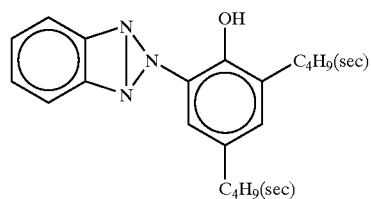
U-2
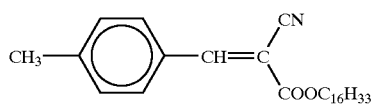

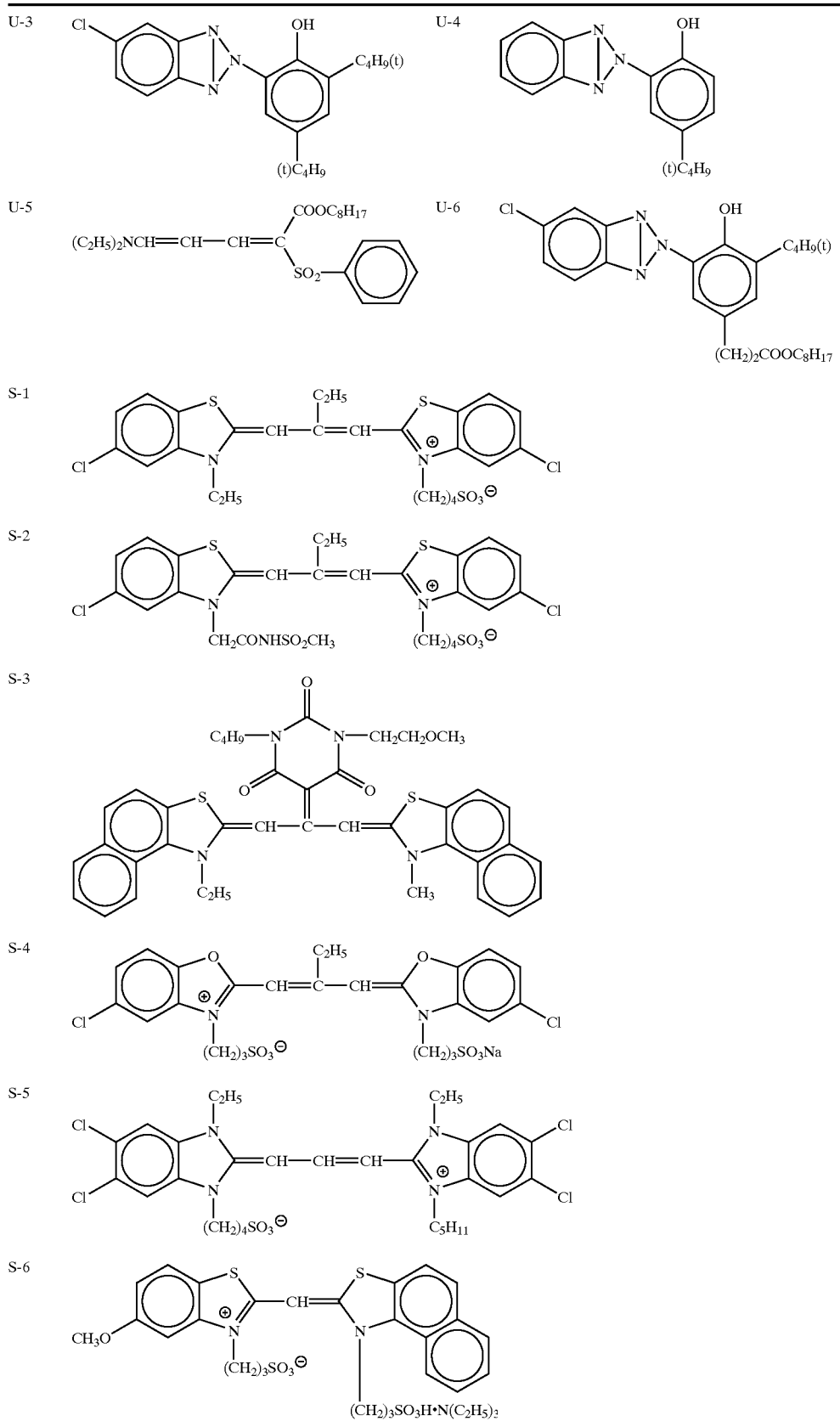

-continued
S-7 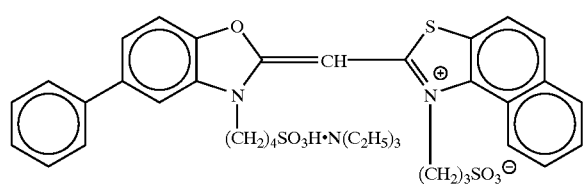
S-8 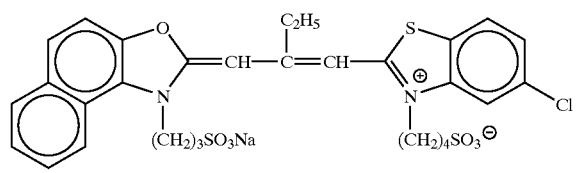
S-9 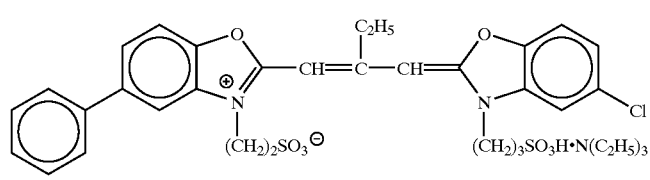
S-10 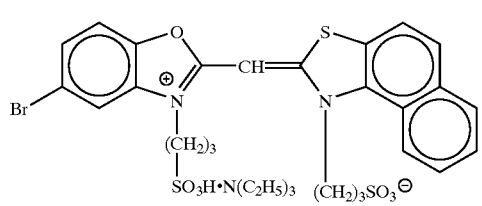
S-11 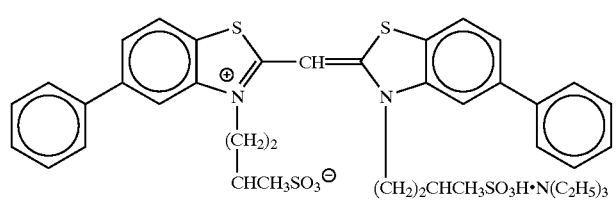
S-12 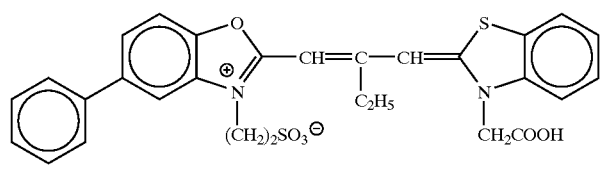
S-13 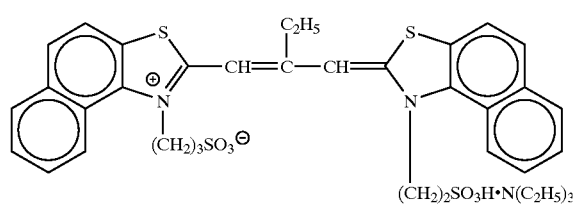
S-14 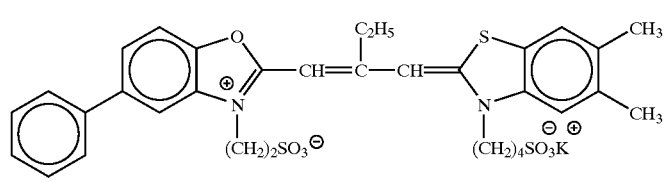

-continued
D-1 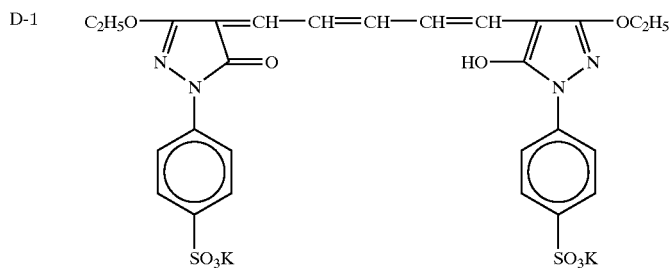
D-2 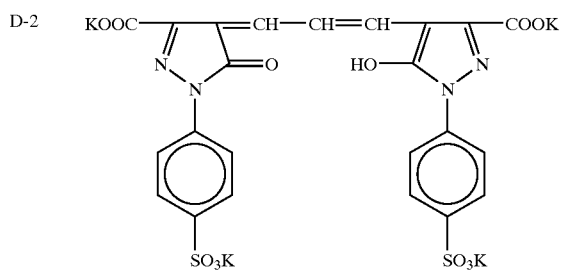
D-3 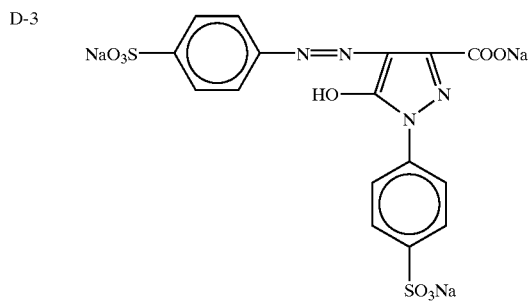
D-4 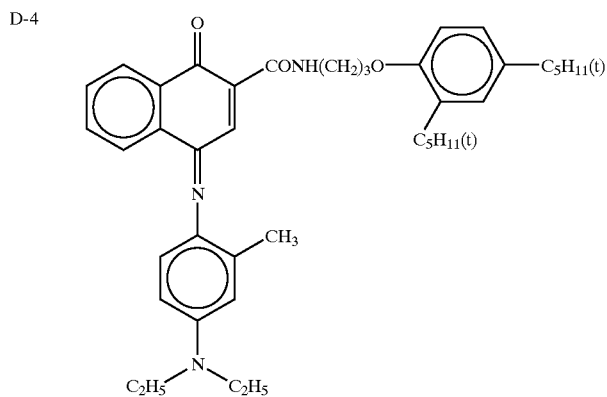
D-5 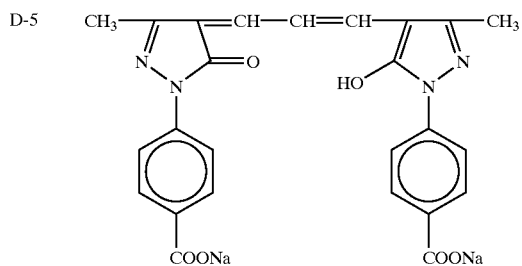

-continued
D-6 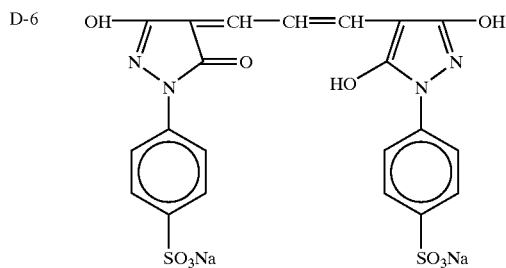
D-7 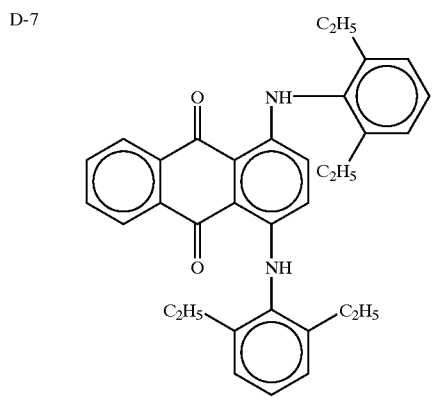
D-8 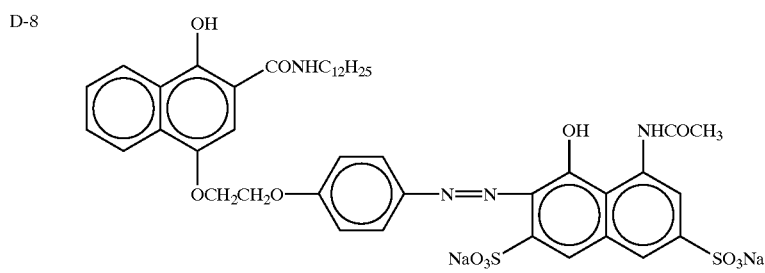
D-9 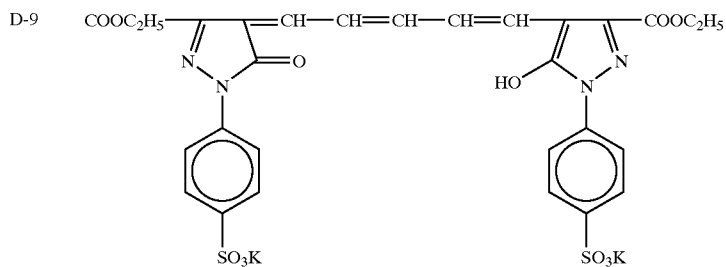
E-1 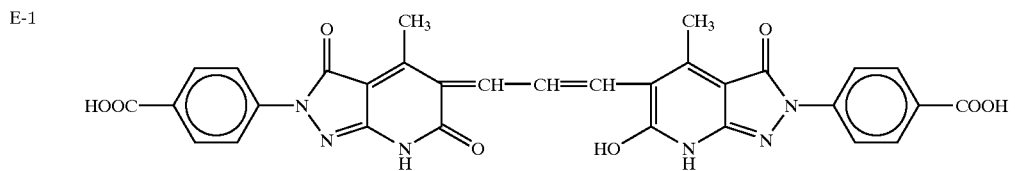

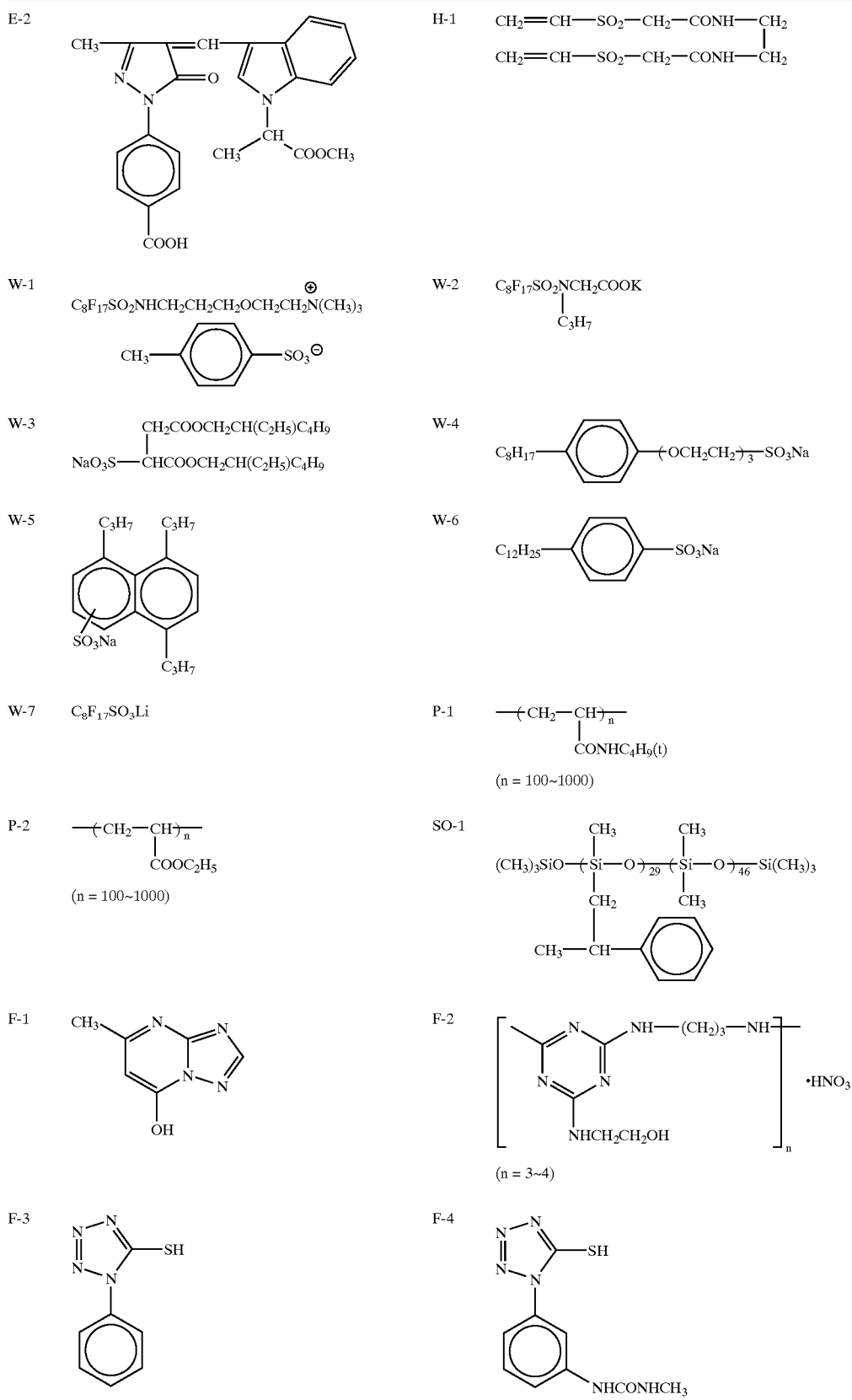

-continued

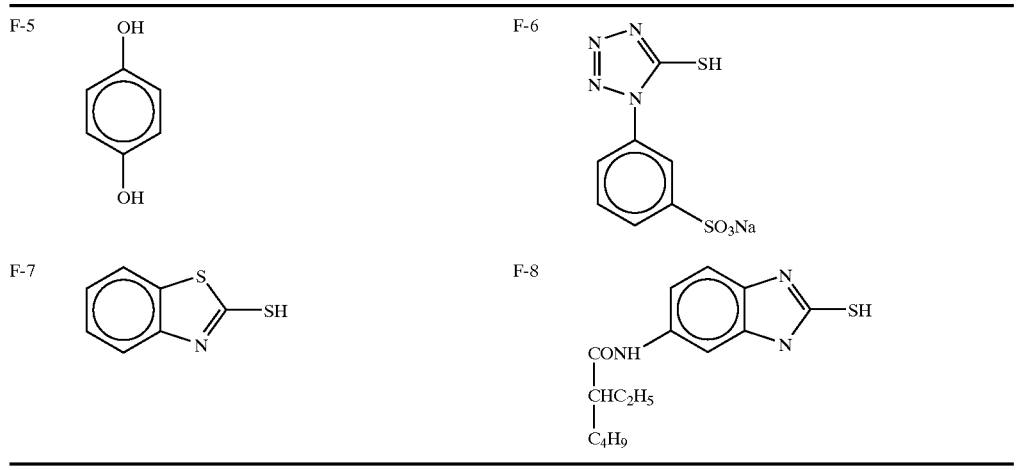

Preparation of Dispersion of Organic Solid Dispersed Dye

The dye E-1 was dispersed in the following manner. In some detail, to 1,430 g of a wet cake of the dye containing 30% of methanol was added 200 g of Pluronic F88 (ethylene oxide-propylene oxide block copolymer produced by BASF INC.) with stirring to make a slurry having a dye concentration of 6%. Subsequently, the slurry was passed through a Type UVM-2 ultraviscomill (produced by Aimex Co., Ltd.) in which zirconia beads having an average particle diameter of 0.5 mm had been packed so that it was ground at a circumferential speed of 10 m/sec and an output of 0.5 l/min for 5 hours. The slurry thus discharged was then filtered to remove the beads therefrom. The slurry was diluted with water to a dye concentration of 3%, and then heated to a temperature of 90° C. for 10 hours so that it was stabilized. The particulate dye thus obtained had an average particle diameter of 0.60 μm and a particle diameter distribution magnitude (standard deviation of particle diameter× 100/average particle diameter) of 18%.

Similarly, a solid dispersion of the dye E-2 was obtained. The solid dispersion has an average particle diameter of 0.54 μm.

(2) Exposure and Development

Using a Type GX 680 camera (produced by Fuji Photo Film Co., Ltd.), a gray plate was picture-taken onto Sample 101 thus obtained so that it was exposed to obtain a gray density of about 0.7. The sample thus exposed was then subjected to color reversal according to the following steps in a process involving conveyance on hunger (hanging development).

| Processing step | [Time] | [Temp.] | [Bath capacity] | [Replenishment rate] |
|---|---|---|---|---|
| black-and-white development | 6 min. | 38° C. | 165 L | 1,100 ml/m² |
| 1st water washing | 2 min. | 35° C. | 50 L | 6,000 ml/min |
| Reversal | 2 min. | 35° C. | 86 L | 1,100 ml/m² |
| Color development | 6 min. | 38° C. | 165 L | 2,150 ml/m² |
| Pre-bleach | 2 min. | 35° C. | 65 L | 1,110 ml/m² |
| Bleach | 6 min. | 35° C. | 150 L | 215 ml/m² |
| Fixing | 4 min. | 35° C. | 108 L | 1,100 ml/m² |

-continued

| Processing step | [Time] | [Temp.] | [Bath capacity] | [Replenishment rate] |
|---|---|---|---|---|
| 2nd water washing | 2 min. | 35° C. | 55 L | 6,000 ml/min |
| 3rd water washing | 2 min. | 35° C. | 56 L | 6,000 ml/min |
| Final rinse | 1 min. | 25° C. | 44 L | 1,100 ml/m² |

The various processing solutions had the following formulations.

| | Running solution | Replenisher |
|---|---|---|
| [Black-and-white developer] | | |
| Pentasodium nitrilo-N,N,N-trimethylenephosphonate | 1.5 g | 1.5 g |
| Pentasodium diethylenetriamine-pentaacetate | 2.0 g | 2.0 g |
| Sodium sulfite | 28 g | 32 g |
| Potassium hydroquinone monosulfonate | 18 g | 21 g |
| Potassium carbonate | 20 g | 20 g |
| Potassium bicarbonate | 15 g | 15 g |
| 1-Phenyl-4-methyl-4-hydroxymethyl-3-pyrazolidone | 1.5 g | 2.4 g |
| Potassium bromide | 2.5 g | 0.4 g |
| Potassium thiocyanate | 1.2 g | 1.2 g |
| Potassium iodide | 2.0 mg | — |
| Diethylene glycol | 15 g | 15 g |
| Water to make | 1 L | 1 L |
| pH adjusted with sulfuric acid or potassium hydroxide to | 9.65 | 9.72 |
| [Reversal solution] | | |
| Pentasodium nitrilo-N,N,N-trimethylenephosphonate | 9.0 g | 9.0 g |
| Stannous chloride dihydrate | 1.5 g | 1.5 g |
| p-Aminophenol | 0.001 g | 0.001 g |
| Sodium hydroxide | 8 g | 8 g |
| Propionic acid | 15 ml | 15 ml |
| Water to make | 1 L | 1 L |
| pH adjusted with acetic acid or potassium hydroxide to | 6.00 | 6.00 |

-continued

| | Running solution | Replenisher |
|---|---|---|
| [Color developer] | | |
| Pentasodium nitrilo-N,N,N-trimethylenephosphonate | 2.0 g | 2.0 g |
| Sodium sulfite | 6.5 g | 7.0 g |
| Trisodium phosphate dodecahydrate | 36 g | 36 g |
| Potassium bromide | 1.0 g | — |
| Potassium iodide | 30 mg | — |
| Sodium hydroxide | 3.0 g | 3.0 g |
| Citrazinic acid | 0.5 g | 0.6 g |
| N-ethyl-N-(β-methanesulfonamideethyl)-3-methyl-4-aminoaniline 3/2 sulfate monohydrate | 9.0 g | 11.0 g |
| 3,6-Dithiaoctane-1,8-diol | 1.0 g | 1.0 g |
| Water to make | 1 L | 1 L |
| pH adjusted with sulfuric acid or potassium hydroxide to | 11.90 | 12.10 |
| [Prebleach] | | |
| Disodium ethylenediamine-tetraacetate dihydrate | 8.0 g | 8.0 g |
| Sodium sulfite | 6.0 g | 8.0 g |
| 1-Thioglycerol | 0.4 g | 0.5 g |
| Formaldehyde-sodium bisulfite adduct | 25 g | 30 g |
| Water to make | 1 L | 1 L |
| pH adjusted with acetic acid or potassium hydroxide to | 6.30 | 6.10 |
| [Bleach bath] | | |
| Disodium ethylenediamine-tetraacetate dihydrate | 2.0 g | 4.0 g |
| Ammonium Fe(III) ethylenediamine-tetraacetate dihydrate | 120 g | 240 g |
| Potassium bromide | 100 g | 200 g |
| Ammonium nitrate | 10 g | 20 g |
| Water to make | 1 L | 1 L |
| pH adjusted with nitric acid or sodium hydroxide to | 5.70 | 5.50 |
| [Fixing solution] | | |
| Ammonium thiosulfate | 80 g | 80 g |
| Sodium sulfite | 5.0 g | 5.0 g |
| Sodium bisulfite | 5.0 g | 5.0 g |
| Water to make | 1 L | 1 L |
| pH adjusted with acetic acid or aqueous ammonia to | 6.60 | 6.60 |
| [Stabilizing solution] | | |
| 1,2-Benzoisothiazoline-3-one | 0.02 g | 0.03 g |
| Polyoxyethylene-tridecaneether (average polymerization degree: 10) | 0.3 g | 0.3 g |
| Water to make | 1 L | 1 L |
| pH | 7.0 | 7.0 |

[Development Test]

The foregoing Sample 101 which had been gray-exposed was subjected to running until the black-and-white developer was used 3 rounds (1 round is reached when the replenishment rate reaches the storage capacity of the processing bath), and then evaluated for three properties, i.e., percent occurrence of developer streaks, sharpness of highlighted area and stability of antifoaming effect according to the following method (Experiment 101).

Subsequently, the foregoing Sample 101 which had been gray-exposed was subjected to running in the same manner as in Experiment 101 except that to the foregoing black-and-white developer replenisher was added the compound set forth in Table 4 in an amount of 5 mg per liter of replenisher, and then evaluated in the same manner as in Experiment 101.

The evaluation methods will be described below.

1. Percent Occurrence of Developer Streaks

The foregoing Sample 101 which had been gray-exposed was subjected to running 3 rounds. Further, 100 units of Sample 101 were processed. The number of samples showing bubble-like developer streaks was then counted and evaluated as percent occurrence of developer streaks (%).

During this procedure, the agitation of the 1st black-and-white developer was carried out by blowing with nitrogen with a cycle of 2 sec-bubbling-8 sec-suspension. Bubbling was suspended while the sample hung on the hanger was moving through the space (about 30 seconds). For the evaluation of developer streaks, bubbling was effected under the foregoing cycling condition for 1 hour or longer until bubbles were sufficiently accumulated on the surface of the liquid in the processing bath. Testing was then began.

2. Sharpness of Highlighted Area

Sample 101 was imagewise gray-exposed, and then processed according to the foregoing steps. The sample thus processed was then measured for yellow density to determine the difference between the logarithm of exposure giving the density (Dmin) of unexposed area plus 0.2 and the density (Dmin) of unexposed area plus 0.5 (log $E_{0.2}$–log $E_{0.5}$). The ratio of the difference value of the processing solution comprising the antifoaming agent set forth in Table 1 incorporated therein to that of the processing solution free of antifoaming agent was then determined as sharpness of highlighted area.

[Sharpness of highlighted area]=(log $E_{0.2}$–log $E_{0.5}$:free of antifoaming agent)/(log $E_{0.2}$–log $E_{0.5}$:antifoaming agent added)× 100

The greater this value is, the harder is the gradation of highlighted area and the better is clearing. Thus, the image can be viewed sharper to advantage.

3. Stability 200 ml of the black-and-white developer which had been used 3 rounds was collected and examined for bubbling. The sample developer was allowed to stand at a temperature of 5° C. for 5 days, filtered, and then again examined for bubbling. For the evaluation of bubbling, the sample developer thus collected was stirred under predetermined condition for a predetermined period of time. After 1 minute of suspension, the sample developer was measured for the height of bubbles. The stability of antifoaming effect of the processing solution which had been subjected to running between shortly after being collected and after being allowed to stand at low temperature was then visually evaluated according to four-stage criterion (VG (Very Good), G (Good), F (Fair) and P (Poor)).

VG: the level that the antifoaming effect does not deteriorate at all.

G: the level that the deterioration of the antifoaming effect slightly observes, with no problem.

F: the level that the deterioration of the antifoaming effect observes within a tolerable range.

P: the level that the deterioration of the antifoaming effect is remarkable.

The results are set forth in Table 4.

TABLE 4

| Experiment No. | Antifoaming agent | | % Occurrence of unevenness | Sharpness of highlighted area | Stability | Remarks |
|---|---|---|---|---|---|---|
| | Compound | % Proportion of EO group | | | | |
| 101 | Not added | — | 42 | 100 (reference) | — (P) | Comparative example |
| 102 | EX-1 | — | 12 | 100 | F | Comparative example |
| 103 | I-4 | 20 | 5 | 105 | F | Present invention |
| 104 | I-6 | 30 | 3 | 110 | G | Present invention (G) |
| 105 | I-7 | 40 | 2 | 115 | G | Present invention (G) |
| 106 | I-9 | 40 | 2 | 113 | G | Present invention (G) |
| 107 | I-17 | 50 | 0 | 120 | VG | Present invention (E) |
| 108 | I-18 | 55 | 0 | 120 | VG | Present invention (E) |
| 109 | I-19 | 60 | 0 | 118 | VG | Present invention (E) |
| 110 | I-20 | 56 | 0 | 118 | VG | Present invention (E) |
| 111 | I-21 | 60 | 0 | 119 | VG | Present invention (E) |
| 112 | I-25 | 55 | 0 | 118 | VG | Present invention (E) |
| 113 | I-24 | 65 | 2 | 110 | G | Present invention (G) |
| 114 | I-15 | 69 | 10 | 105 | G | Present invention |
| 115 | II-1 | 20 | 8 | 112 | G | Present invention |
| 116 | II-2 | 30 | 5 | 112 | G | Present invention (G) |
| 117 | II-3 | 42 | 3 | 115 | G | Present invention (G) |
| 118 | III-2 | 31 | 7 | 110 | G | Present invention |
| 119 | III-3 | 43 | 7 | 112 | G | Present invention |
| 120 | IV-2 | 31 | 8 | 112 | G | Present invention |
| 121 | IV-3 | 43 | 8 | 112 | G | Present invention |
| 122 | IV-5 | 24 | 20 | 110 | F | Present invention |
| 123 | IV-6 | 14 | 25 | 108 | F | Present invention |

(Note): The symbol G in the column of remarks indicates a desirable example in the examples of the invention. The symbol E indicates a more desirable example.

As can be seen in the results, the addition of the compound of the invention makes it possible to lessen bubble developer streaks and exhibit an excellent highlight sharpness and exert an excellent antifoaming effect on the compound of the following general formula (Ex-1) described in Japanese Patent Laid-Open No. 2000-112095 under low temperature conditions.

$C_8F_{17}SO_3Li$ (Ex-1)

EXAMPLE 2

The compounds I-9, I-17, I-18, I-19 and I-21 of the invention described in Example 1 were each used to prepare a 0.1% aqueous solution. To the black-and-white developer replenisher was then added each of these aqueous solutions in an amount of 5 ml per liter. These samples were each subjected to test in the same manner as in Example 1. As a result, it was confirmed that quite the same effect was obtained.

It can be thus seen that while the antifoaming agent according to the invention may be incorporated in the replenisher as a constituent as described in Example 1, it may be used in the form of liquid composition [mixed processing agent] from the standpoint of workability and suppliability as shown in the results of Example 2.

EXAMPLE 3

The 0.1% aqueous solution of the compound of the invention prepared in Example 2 was added to the color developer of Example 1 in an amount of 5 ml per liter. As a result, the color developer was fairly cleared of bubbles, eliminating the occurrence of stain in the processing bath. In other words, it was demonstrated that the antifoaming agent according to the invention exerts its effect on the color developer as well.

EXAMPLE 4

A concentrated solution of the compound of the invention was prepared in the following manner. The concentrated solution thus prepared was then added to the black-andwhite developer replenisher in an amount of 5 ml per liter. The sample thus prepared was then subjected to test in the same manner as in Example 2. As a result, quite the same effect was confirmed. Further, neither precipitation nor deposition was observed even after 2 weeks of storage at a temperature of −5° C. It was thus demonstrated that the antifoaming agent to be used in the invention exhibits a good stability with respect to all of photographic properties, preparability and solubility even in the form of concentrated processing agent.

| (Mixed processing solution 1) | |
|---|---|
| Water | 500 ml |
| DEG | 400 g |
| I-9 of the invention | 5 g |
| Water to make | 1 L |
| (Mixed processing solution 2) | |
| Water | 700 ml |
| Methanol | 250 ml |
| I-17 of the invention | 10 g |
| Water to make | 1 L |
| (Mixed processing solution 3) | |
| Water | 700 ml |
| I-19 of the invention | 1 g |
| Benzoisothiazolone | 0.1 g |
| Water to make | 1 L |
| (Mixed processing solution 4) | |
| Water | 700 ml |
| I-18 of the invention | 5 g |
| ethanol | 100 ml |
| Water to make | 1 L |

EXAMPLE 5

Processing was effected in the same manner as in Example of Japanese Patent Laid-Open No. 2000-75448 except that the processing agents 1 and 4 prepared in Example 4 was added to the color developer of Example 3 in Japanese Patent Laid-Open No. 2000-75448 in an amount of 5 ml per liter. As a result, it was confirmed that the mixed processing agent 1 exerts an antifoaming effect even on the development of color negative photographic light-sensitive material to lessen developer streaks.

In accordance with the present invention, the effect of antifoaming agent can be sufficiently exerted. In other words, no turbidity or precipitation occurs in the developer, lessening developer streaks due to bubbles produced in the developer. Further, this effect can last stably. Moreover, the photographic properties such as gradation of highlighted area can be improved.

The present invention is useful in the inhibition of production of bubbles during the development of photographic light-sensitive material, particularly color reversal photographic light-sensitive material. The present invention can be used at any development step. In particular, the present invention is useful in the inhibition of production of bubbles at the first development (black-and-white) step in color reversal processing.

The entire disclosure of each and every foreign patent application from which the benefit of foreign priority has been claimed in the present application is incorporated herein by reference, as if fully set forth.

What is claimed is:

1. A photographic processing antifoaming composition comprising an aqueous solution containing an alcohol and at least one of (polyethylene oxide/polypropylene oxide) copolymer represented by formulae (I) to (IV) below as a surface active agent:

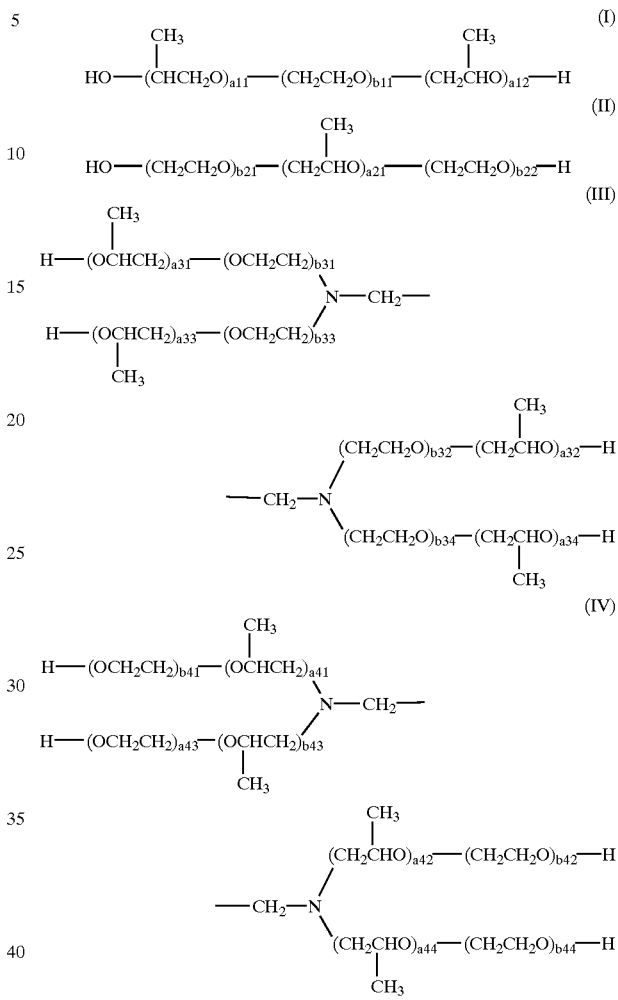

wherein $a_{11}$, $a_{12}$, $b_{11}$, $a_{21}$, $b_{21}$, $b_{22}$, $a_{31}$, $a_{32}$, $a_{33}$, $a_{34}$, $b_{31}$, $b_{32}$, $b_{33}$, $b_{34}$, $a_{41}$, $a_{42}$, $a_{43}$, $a_{44}$, $b_{41}$, $b_{42}$, $b_{43}$ and $b_{44}$ each independently represents the average number of the respective alkyleneoxy groups.

2. The A photographic processing antifoaming composition comprising a (polyethylene oxide/polypropylene oxide) copolymer represented by formula (I) below as a surface active agent:

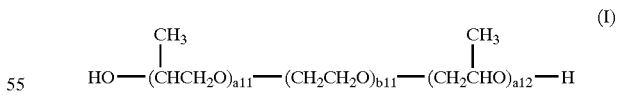

wherein $a_{11}$, $a_{12}$, and $b_{11}$ each independently represents the average number of the respective alkyleneoxy groups.

3. The photographic processing anitifoaming composition according to claim 2, wherein the (polyethylene oxide/polypropylene oxide) copolymer represented by formula (I) contains: the ethylene oxide group in a proportion of from 40% to 65% by weight; and the propylene oxide group moiety having a molecular weight of 2,000 to 5,500.

4. The photographic processing antifoaming composition according to claim 2, wherein the (polyethylene oxide/polypropylene oxide) copolymer represented by formula (I)

contains: the ethylene oxide group in a proportion of from 50% to 60% by weight; and the propylene oxide group moiety having a molecular weight of 2,500 to 4,500.

5. The photographic processing antifoaming composition according to claim 1, which is received in a package.

6. A first black-and-white developer replenisher for a silver halide color reversal photographic material, which comprises the photographic processing antifoaming composition of claim 1.

7. A process for defoaming a first black-end-white development bath, which comprises eliminating a foam produced on the surface of a first black-and-white developer for a silver halide color reversal photographic material with the photographic processing antifoaming composition according to claim 1.

8. A first black-and-white developer replenisher for a silver halide color reversal photographic material, which comprises the photographic processing antifoaming composition of claim 1.

9. A method for processing a silver halide photographic material, which comprises processing a silver halide color photographic material with a photographic processing antifoaming composition according to claim 1.

10. The photographic processing antifoaming composition according to claim 2, which is received in a package.

11. The photographic processing antifoaming composition according to claim 2, wherein the composition comprises an aqueous solution containing an alcohol and said (polyethylene oxide/polypropylene oxide) copolymer.

* * * * *